(12) United States Patent
Kato et al.

(10) Patent No.: US 7,702,174 B2
(45) Date of Patent: Apr. 20, 2010

(54) IMAGE PROCESSING APPARATUS AND IMAGE PROCESSING METHOD

(75) Inventors: Yumi Kato, Tokyo (JP); Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/246,043

(22) Filed: Oct. 6, 2008

(65) Prior Publication Data

US 2009/0041351 A1 Feb. 12, 2009

Related U.S. Application Data

(62) Division of application No. 10/518,607, filed as application No. PCT/JP2004/006328 on Apr. 30, 2004, now Pat. No. 7,450,757.

(30) Foreign Application Priority Data

May 6, 2003 (JP) ............................. 2003-164372
May 6, 2003 (JP) ............................. 2003-164373

(51) Int. Cl.
*G06K 9/40* (2006.01)

(52) U.S. Cl. ..................... 382/260; 382/171; 382/172; 382/173; 382/195; 358/453

(58) Field of Classification Search ............... 382/285, 382/276, 164, 168, 169, 170, 171, 172, 190, 382/195, 254, 256, 257, 258, 259, 260, 279, 382/281; 358/453; 348/578; 345/419
See application file for complete search history.

(56) References Cited

U.S. PATENT DOCUMENTS

| | | | |
|---|---|---|---|
| 6,018,586 A | 1/2000 | Kamei | |
| 6,507,670 B1 * | 1/2003 | Moed | ........................ 382/172 |
| 7,085,013 B2 * | 8/2006 | Yamakawa | ................... 358/2.1 |
| 7,130,463 B1 * | 10/2006 | Spangler | ..................... 382/168 |
| 7,221,799 B2 * | 5/2007 | Okubo et al. | ............... 382/199 |
| 2002/0048014 A1 | 4/2002 | Kono et al. | |

FOREIGN PATENT DOCUMENTS

| | | |
|---|---|---|
| JP | 06-339028 | 12/1994 |
| JP | 07-210655 | 8/1995 |
| JP | 8-287255 | 1/1996 |

(Continued)

OTHER PUBLICATIONS

Japanese Patent Office, Office Action issued in Patent Application JP 2003-164372, on Sep. 24, 2009.

(Continued)

*Primary Examiner*—Vikkram Bali
*Assistant Examiner*—Ali Bayat
(74) *Attorney, Agent, or Firm*—Sonnenschein Nath & Rosenthal LLP

(57) ABSTRACT

A data distribution system in which distribution data is generated by a distribution data generation portion, a second range is specified by a specifying portion, the second range is mapped to a first range by a mapping portion, and third image data is generated by performing binarization based on a threshold value regulated in the first range by various components. In this way, binarization can be suitably performed even when pixel value distribution data differs for each subject.

4 Claims, 32 Drawing Sheets

FOREIGN PATENT DOCUMENTS

| | | |
|---|---|---|
| JP | 11-224892 A | 8/1998 |
| JP | 2000-050075 A | 2/2000 |
| JP | 2000-134476 A | 5/2000 |
| JP | 2000-134491 A | 5/2000 |
| JP | 2001-144960 | 5/2001 |
| JP | 2001-160902 A | 6/2001 |
| JP | 2002-92616 | 3/2002 |
| JP | 2002-135589 | 5/2002 |
| JP | 2002-334332 A | 11/2002 |
| JP | 2002-344742 A | 11/2002 |
| JP | 2003-098117 A | 4/2003 |
| WO | 2004-100069 A1 | 11/2004 |

OTHER PUBLICATIONS

Japanese Patent Office, Office Action issued in Patent Application JP 2003-164373, on Apr. 28, 2009.

* cited by examiner

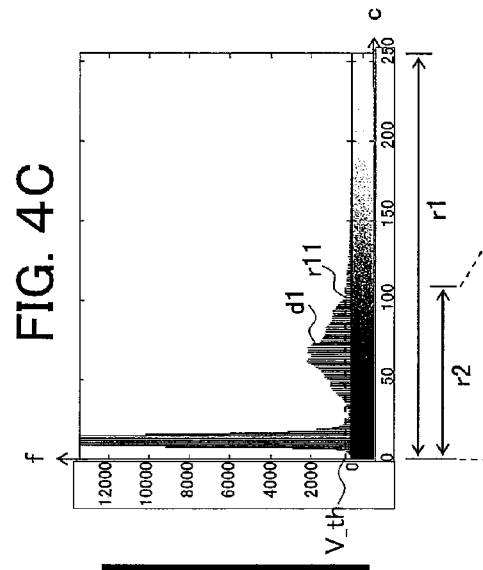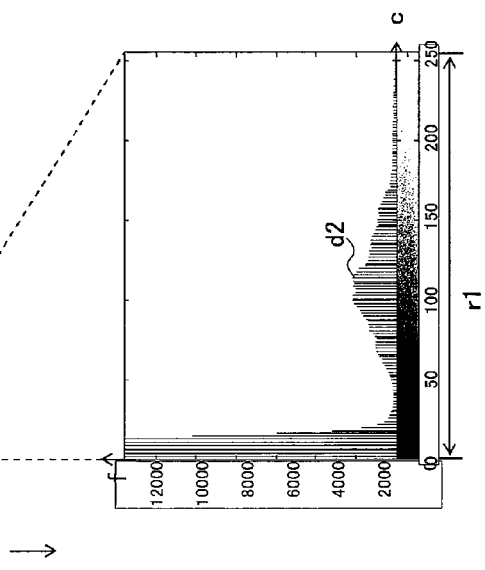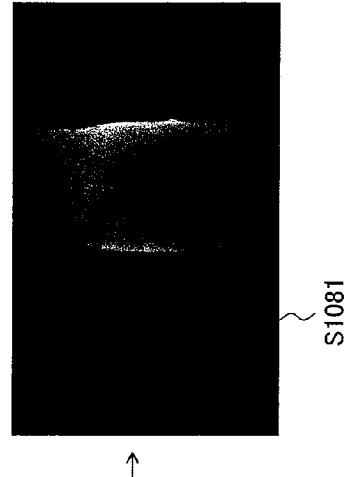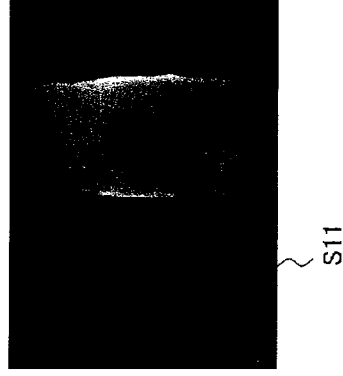
FIG. 4A
FIG. 4B
FIG. 4C
FIG. 4D
FIG. 4E

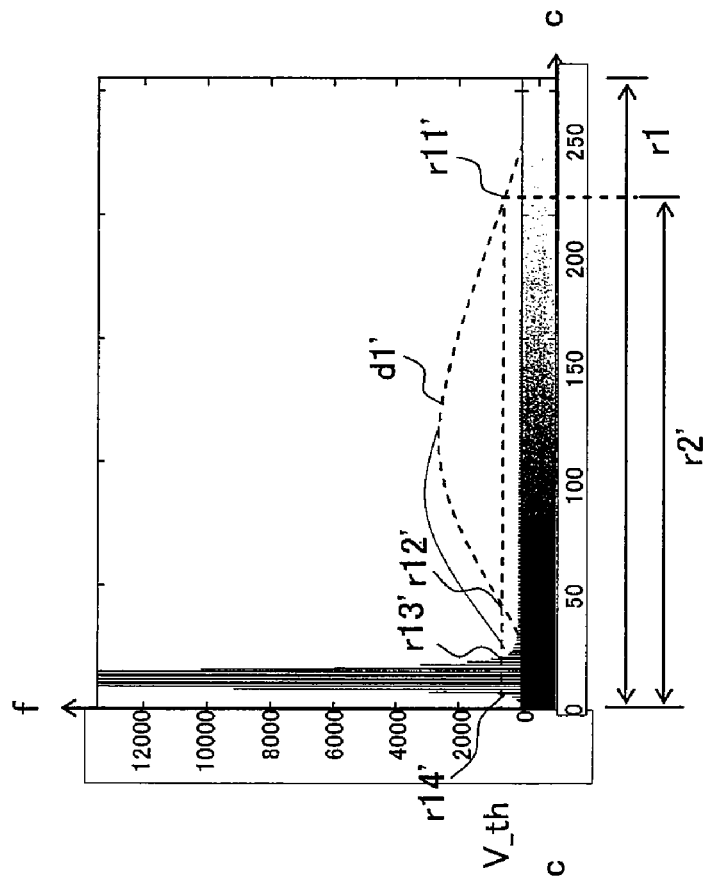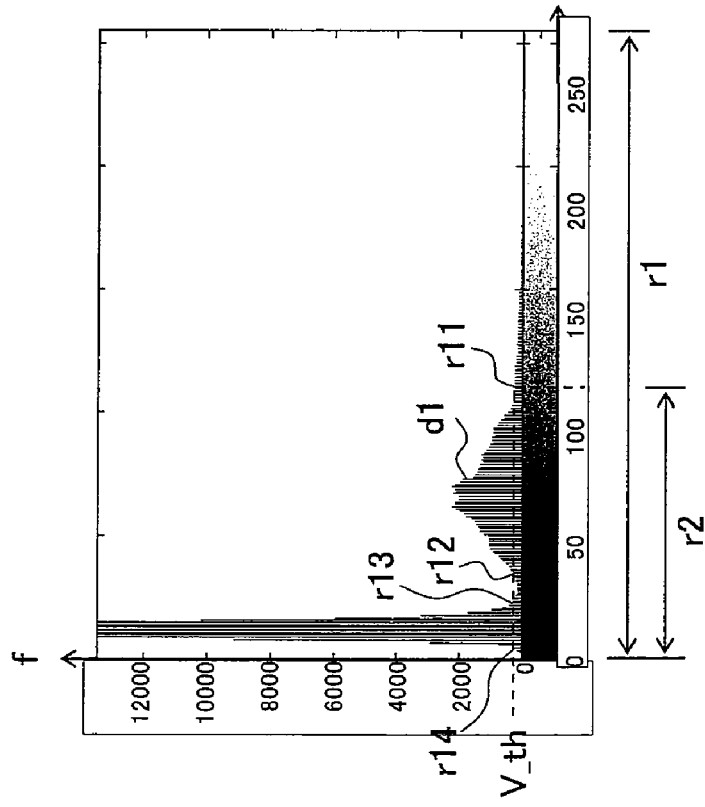

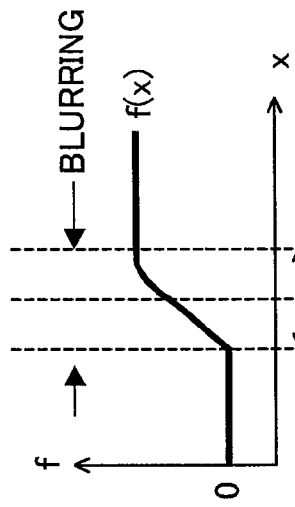
FIG. 9A
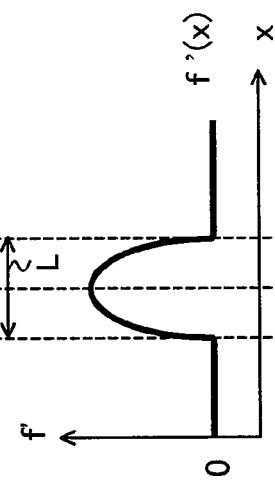
FIG. 9B
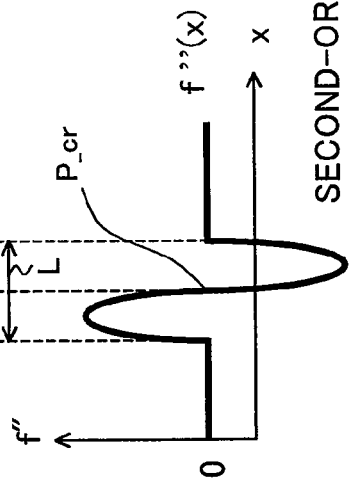
FIG. 9C
FIRST-ORDER DIFFERENTIAL
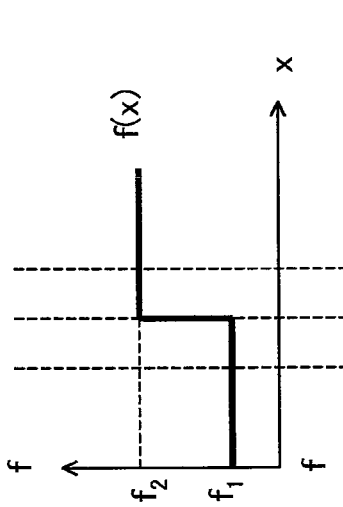
FIG. 9D
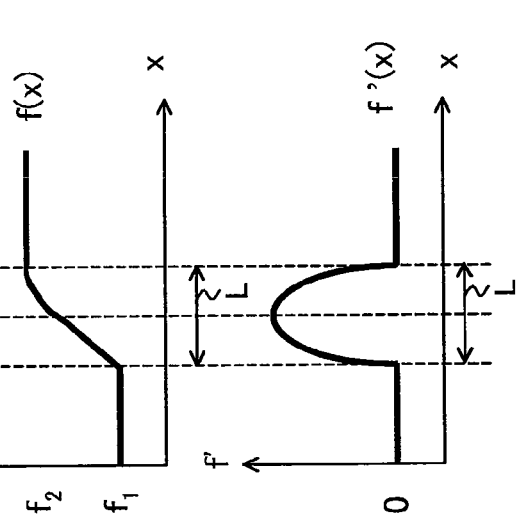
FIG. 9E
FIG. 9F
SECOND-ORDER DIFFERENTIAL

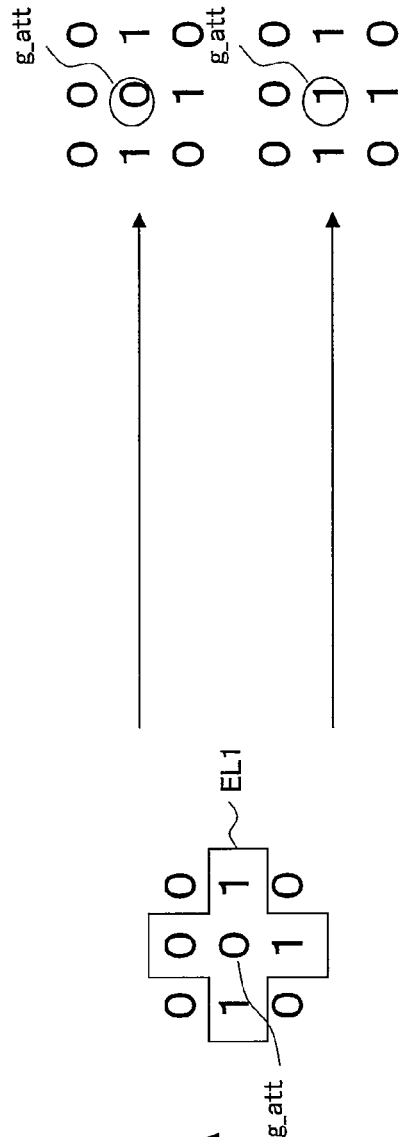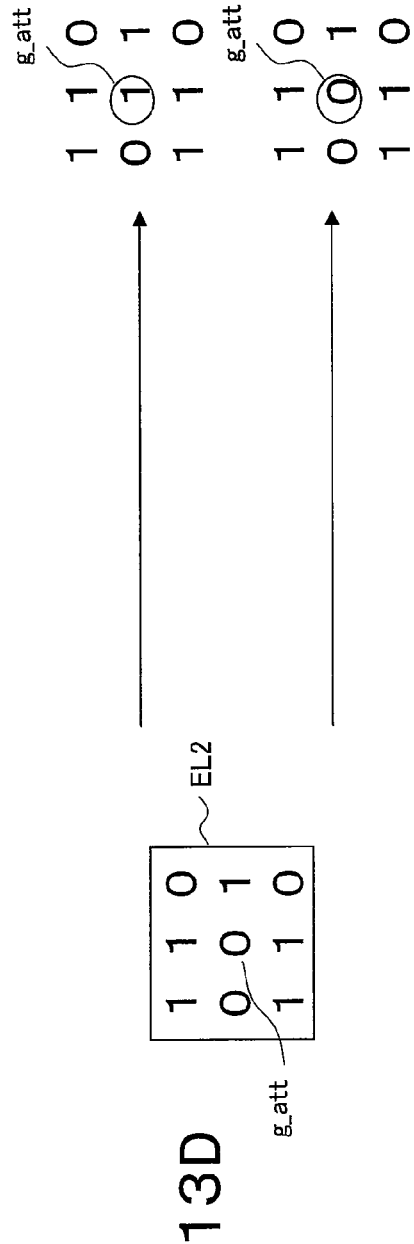

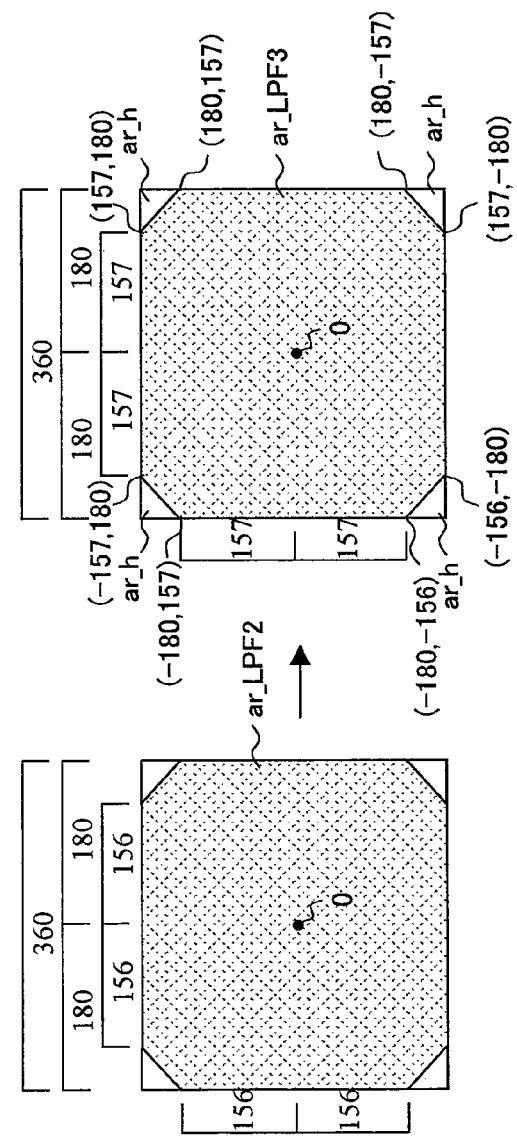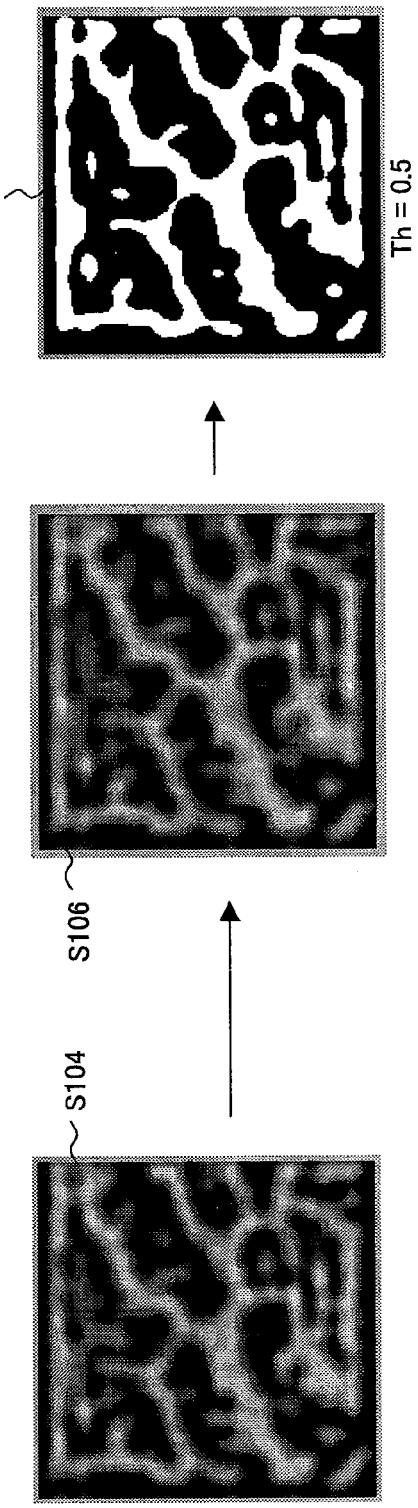

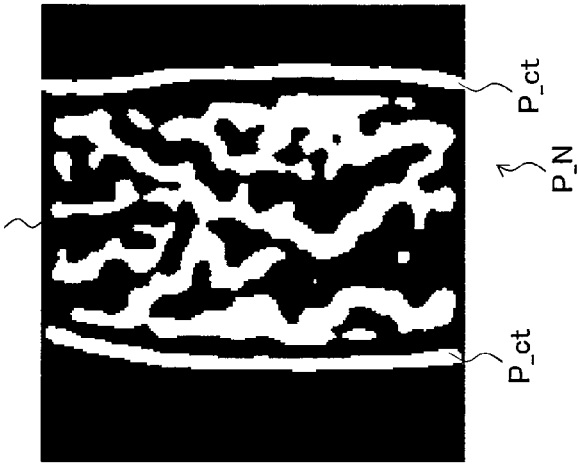
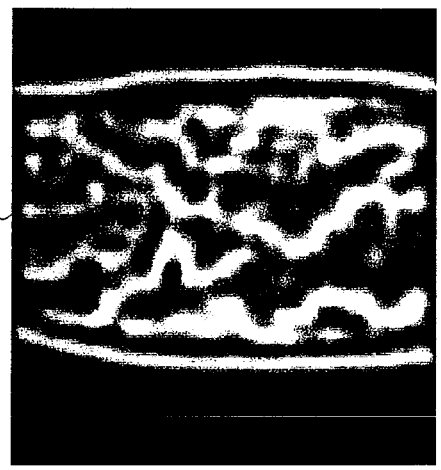
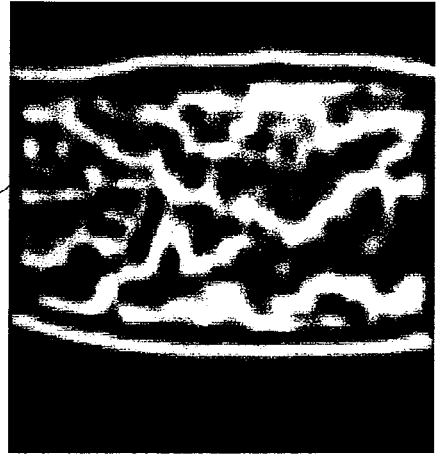

FIG. 23
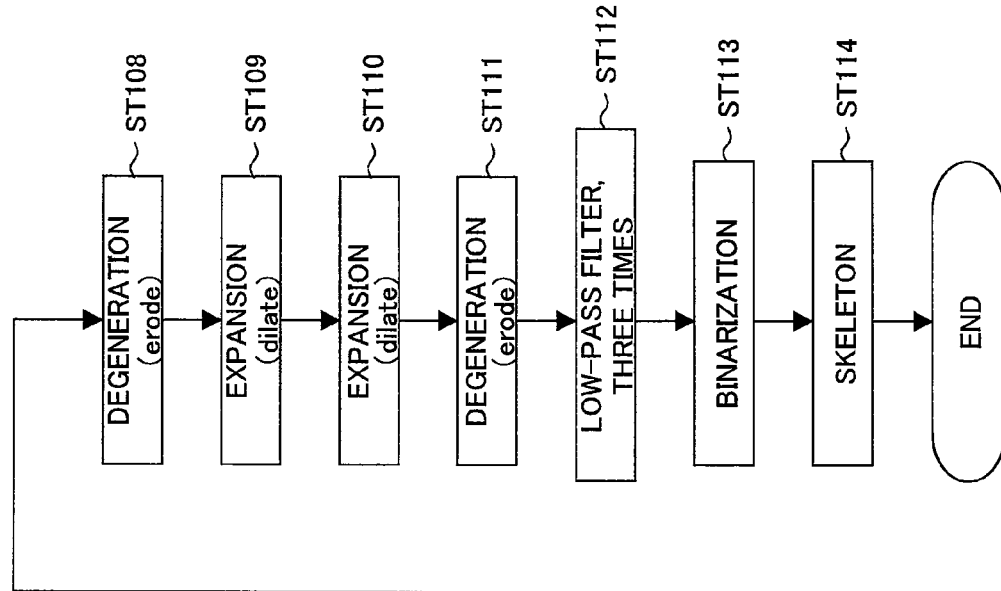
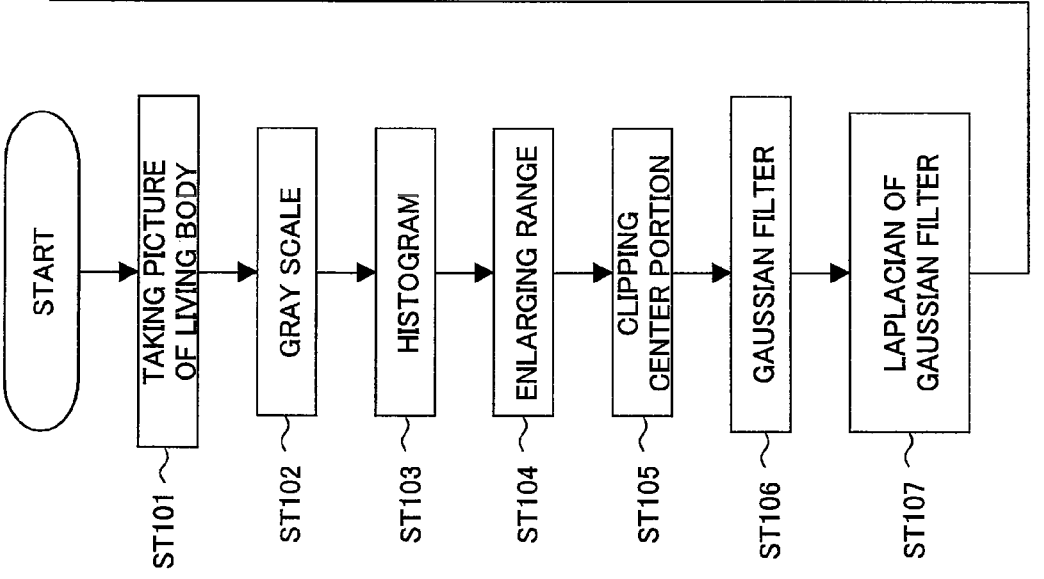

IMAGE PROCESSING APPARATUS AND IMAGE PROCESSING METHOD

RELATED APPLICATION DATA

This application is a division of U.S. patent application Ser. No. 10/518,607, filed Dec. 23, 2004, the entirety of which is incorporated herein by reference to the extent permitted by law. U.S. patent application Ser. No. 10/518,607 is the Section 371 National Stage of PCT/JP2004/006328. This application claims the benefit of priority to Japanese Patent Application Nos. 2003-164372, filed May 6, 2003 and 2003-164373, filed May 6, 2003.

BACKGROUND OF THE INVENTION

The present invention relates to an image processing apparatus for processing image data, for example, obtained by taking an image of a subject and an image processing method.

There is conventionally known an identifying device for performing individual identifying processing, for example, by using image data obtained by taking a picture of a living body (subject) (refer to, for example, the Japanese Unexamined Patent Publication No. 10-127609).

In the above conventional identifying device, identifying processing is performed, for example, by taking a picture of transmitted light of a hand of the subject and generating binarized image data based on a predetermined threshold value of pixel values of the image data. For example, the identifying device performs identifying processing based on a pattern indicating an arrangement of blood vessels in the binarized image data.

A distribution of pixel values of taken image data differs in each subject. For example, as to image data of a subject with much fat component, the distribution data of pixel values spreads in a wide range and an average value of pixel values is relatively high comparing with image data of a subject with less fat component.

Since the above conventional identifying device performs binarization processing based on a predetermined threshold value, suitable binarized image data can be generated for image data of a subject with less fat component, while there is a case where binarized data having lopsided pixel values is undesirably generated for image data of a subject with much fat component and binarization processing cannot be performed suitably, so that improvement is demanded.

Also, image data obtained by taking a picture of a subject includes very small regions equivalent to noise components, and the noise components largely affects on accuracy of identifying processing. Therefore, there has been a demand to remove regions of a predetermined size equivalent to noise components from the image data.

Also, a linear pattern in the image data is significant in the identifying processing, but the linear pattern is broken due to noise, etc. and cannot be visually recognized clearly in some cases. Therefore, there is a demand for obtaining image data including a clear linear pattern by connecting between pixel data close to each other to a certain extent by considering noise, etc.

SUMMARY OF THE INVENTION

An object of the present invention is to provide an image processing apparatus and an image processing method capable of suitably performing binarization processing even in the case where distribution data of pixel values differs in each subject.

Another object of the present invention is to provide an image processing apparatus and an image processing method capable of removing regions being smaller than a predetermined size from image data obtained by taking a picture of a subject and connecting pixel data close to a certain extent to each other.

To attain the above object, an image processing apparatus of a first aspect of the present invention is an image processing apparatus, comprising: a distribution data generation means for generating distribution data indicating a distribution of pixel data for a plurality of pixel data indicating pre-regulated pixel values in the first range and composing first image data obtained by taking a picture of a subject; a specifying means for specifying a second range to be binarized in the first range based on the distribution data generated by the distribution data generation means; a mapping means for mapping pixel data in the second range specified by the specifying means among a plurality of pixel data to the first range, and generating second image data composed of the mapped pixel data; and a binarization means of binarizing the second image data generated by the mapping means based on a threshold value regulated in the first range to generate a third image data.

According to the image processing apparatus of the first aspect of the present invention, the distribution data generation means generates distribution data indicating a distribution of pixel data for a plurality of pixel data indicating pre-regulated pixel values in the first range composing first image data obtained by taking a picture of a subject.

The specifying means specifies a second range to be binarized in the first range based on the distribution data generated by the distribution data generation means.

The mapping means maps pixel data in the second range specified by the specifying means among a plurality of pixel data to the first range, and generates second image data composed of the mapped pixel data.

The binarization means binarizes the second image data generated by the mapping means based on a threshold value regulated in the first range to generate third image data.

Furthermore, to attain the above objects, an image processing apparatus of a second aspect of the present invention is an image processing apparatus, comprising: a first processing means for indicating a pixel value and using as a pixel data the minimum pixel data in the first region around the pixel data, for each of a plurality of pixel data composing the first image data obtained by a taking a picture of a subject; and a second processing means for generating a second image data by using as the pixel data the maximum pixel data among pixel data in the second region larger than the first region around the pixel data for each of image data by the first processing means.

Furthermore, to attain the above objects, an image processing method of a third aspect of the present invention is an image processing method, including: a first step for generating distribution data indicating a distribution of pixel data for a plurality of pixel data indicating pre-regulated pixel values in the first range and composing first image data obtained by taking a picture of a subject; a second step for specifying a second range to be binarized in the first range based on the distribution data generated by the first step; a third step for mapping pixel data in the second range specified by the second step among a plurality of pixel data to the first range, and generates second image data composed of the mapped pixel data; and a forth step for binarizing the second image data generated by the fourth step on a threshold value regulated in the first range to generate third image data.

Furthermore, to attain the above objects, an image processing method of a fourth aspect of the present invention is an image processing method, including: a first step for indicating a pixel value and using as a pixel data the minimum pixel data in the first region around the pixel data, for each of a plurality of pixel data composing the image data obtained by a taking a picture of a subject; and a second step for generating a second image data by using as a pixel data the maximum pixel data among pixel data in the second region being larger than the first region around the pixel data by the first step.

According to the present invention, it is possible to provide an image processing apparatus and an image processing method capable of suitably performing binarization processing even in the case where distribution data of pixel values differs for each subject.

Also, according to the present invention, it is possible to provide an image processing apparatus and an image processing method capable of removing regions being smaller than a predetermined size from image data obtained by taking a picture of a subject and connecting between pixel data being close to a certain extent.

BRIEF DESCRIPTION OF DRAWINGS

FIG. 4A to FIG. 4E are views for explaining an operation of the data processing apparatus shown in FIG. 1. FIG. 4A is a view showing an example of image data S11. FIG. 4B is a view showing an example of image data S1081. FIG. 4C is a view showing an example of distribution data d1. FIG. 4D is an enlarged view of distribution data. FIG. 4E is a view showing an example of image data S1084.

FIG. 5A and FIG. 5B are views for explaining an operation of a specific portion shown in FIG. 3. FIG. 5A is a view showing an example of distribution data d1. FIG. 5B is a view showing an example of distribution data d1'.

FIG. 9A to FIG. 9F are views for explaining a Gaussian Laplacian filter. FIG. 9A is a view showing an example of step-shaped pixel values. FIG. 9B is a view showing an example of pixel values. FIG. 9C is a view showing pixel values subjected to first-order differential processing. FIG. 9D is a view showing an example of pixel values. FIG. 9E is a view showing an example of pixel values subjected to primary differential processing. FIG. 9F is a view showing an example of pixel values subjected to second-order differential processing.

FIG. 10A is a view showing an example of image data S1804. FIG. 10B is a view showing an example of image data S1805. FIG. 10C is a view showing an example of image data S1806.

FIG. 12A is a view showing an example of image data including noise components. FIG. 12B is a view showing an example of image data subjected to noise removing processing. FIG. 12C is a view showing an example of image data. FIG. 12D is a view showing an example of image data subjected to connection processing.

FIG. 13A to FIG. 13F are views for explaining degeneration processing and expansion processing of data processing apparatus shown in FIG. 1. FIG. 13A is a view showing an example of pixel data. FIG. 13B is an example of pixel data when degeneration processing is performed based on pixels in a cross-shaped element. FIG. 13C is an example of pixel data when expansion processing is performed based on pixels in a cross-shaped element. FIG. 13D is a view showing an example of pixel data. FIG. 13E is an example of pixel data when degeneration processing is performed based on pixels in 3×3 element.

FIG. 14A is a view showing an example of image data S1807. FIG. 14B is a view showing an example of image data S1808. FIG. 14C is a view showing an example of image data S1810.

FIG. 16A is a view showing an example of a reference region in a two-dimensional Fourier space. FIG. 16B is a view showing an example of an enlarged reference region by predetermined magnification. FIG. 16C is a view showing an example of a low-pass filter. FIG. 16D is a view showing an example of image data. FIG. 16E is a view showing an example of image data subjected to low-pass filter processing. FIG. 16F is a view showing an example of image data subjected to binarization processing.

FIG. 17A is a view showing an example of a reference region in a two-dimensional Fourier space. FIG. 17B is a view showing an example of a low-pass filter. FIG. 17C is a view showing an example of image data. FIG. 17D is a view showing an example of image data subjected to low-pass filter processing. FIG. 17E is a view showing an example of image data subjected to binarization processing.

FIG. 18A to FIG. 18E are views for explaining an operation of third low-pass filter processing of the low-pass filter portion. FIG. 18A is a view showing an example of a reference region in the two-dimensional Fourier space. FIG. 18B is a view showing an example of a low-pass filter. FIG. 18C is a view showing an example of image data. FIG. 18D is a view showing an example of image data subjected to low-pass filter processing. FIG. 18E is a view showing an example of image data subjected to binarization processing.

FIG. 19A is a view showing an example of image data S1810. FIG. 19B is a view showing an example of image data S18102. FIG. 19C is a view showing an example of image data S18103. FIG. 19D is a view showing an example of image data S18102. FIG. 19E is a view showing an example of image data S18104. FIG. 19F is a view showing an example of image data S18105.

FIG. 20A to FIG. 20C are views for explaining an operation of the low-pass filter portion of the data processing apparatus shown in FIG. 1. FIG. 20A is a view showing an example of image data S1804. FIG. 20B is a view showing an example of image data S18106. FIG. 20C is a view showing an example of image data S1811.

FIG. 22A is a view showing an example of a mask pattern. FIG. 22B is a view showing an example of image data S1812. FIG. 22C is a view showing an example of image data S1813.

FIG. 23 is a flowchart for explaining an overall operation of the data processing apparatus shown in FIG. 1.

DETAILED DESCRIPTION OF THE PRESENTLY PREFERRED EMBODIMENTS

An image processing apparatus according to the present invention generates distribution data indicating a distribution of pixel data, specifies a second range to be binarized, maps pixel data in the second range to a first range, generates image data composed of the mapped pixel data, and binarizes the image data based on a threshold value regulated in the first range to generate binarized image data, based on image data obtained by taking a picture of a subject, for a plurality of pixel data composing the image data and indicating pixel values of a first range regulated in advance.

Furthermore, an image processing apparatus according to the present invention eliminates regions being smaller than a predetermined size from the image data obtained by taking a picture of the subject and connects between pixel data close to a certain extent to each other.

Specifically, the image processing apparatus generates second image data for each of the plurality of pixel data composing first image data obtained by taking a picture of the subject and indicating pixel values, by using as the pixel data minimum pixel data among pixel data in the first region around the pixel data and, furthermore, using as pixel data maximum pixel data among pixel data in a second region being larger than the first region around the pixel data for each of the pixel data.

Below, as a first embodiment of an image processing apparatus according to the present invention, a data processing apparatus for generating image data by taking a picture of a part with blood vessels of a living body of a subject h, extracting blood vessel information by performing image processing on the image data, and performing authentication processing based on the extracted blood vessel information will be explained.

Figure 1:
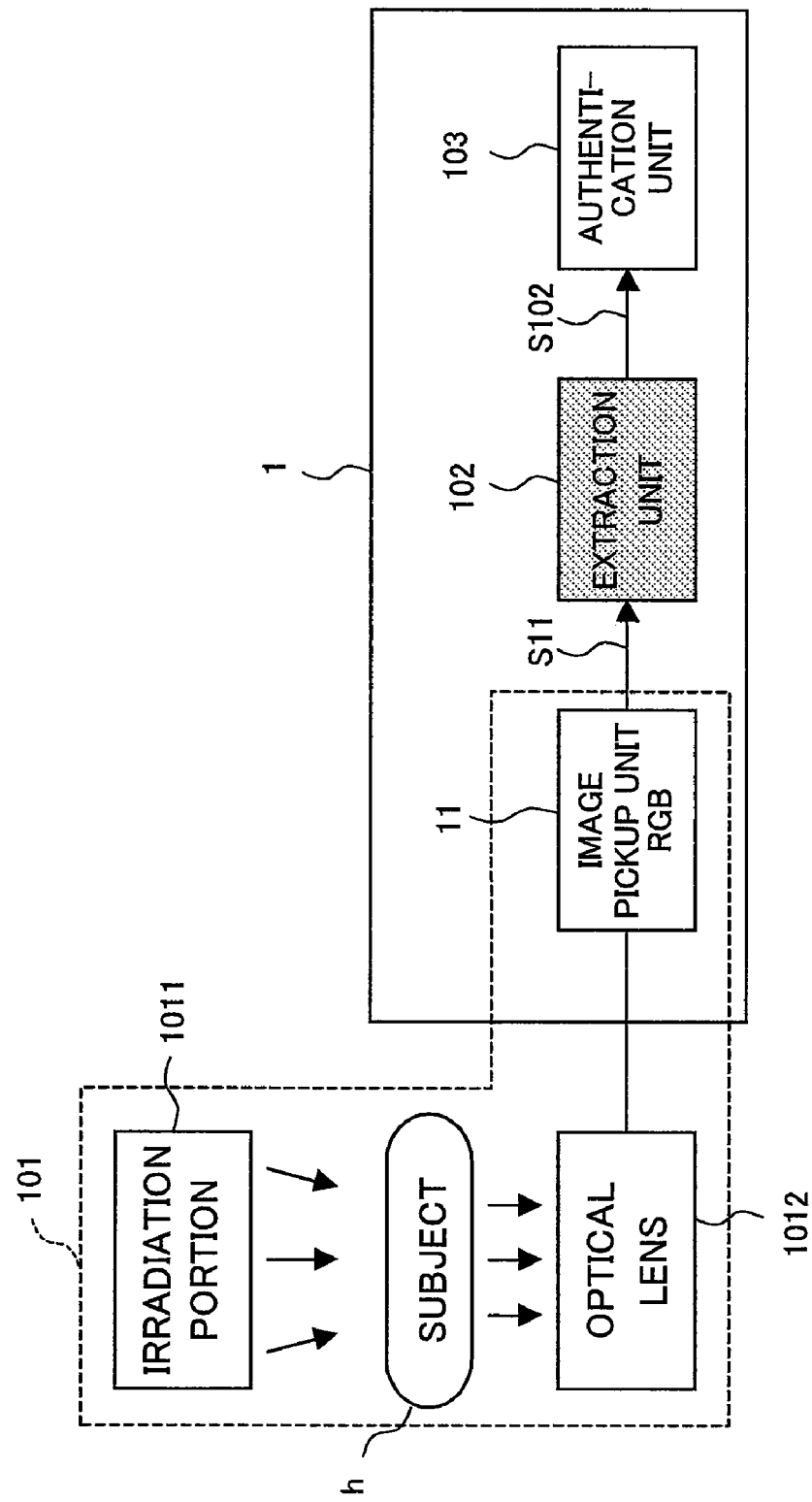
FIG. 1 is an overall schematic view of a first embodiment of a data processing apparatus according to the present invention.

FIG. 1 is an overall schematic view of the first embodiment of the data processing apparatus according to the present invention.

A data processing apparatus 1 according to the present embodiment comprises, as shown in FIG. 1, an image pickup system 101, an extraction unit 102, and an authentication unit 103. The data processing apparatus 1 corresponds to an example of an image processing apparatus according to the present invention.

The image pickup system 101 takes a picture of a subject h to generate image data and outputs the image data as a signal S11 to the extraction unit 102.

The image pickup system 101 specifically comprises an irradiation portion 1011 and an optical lens 1012.

The irradiation portion 1011 is composed, for example, of a halogen lamp, etc. and irradiates an electromagnetic wave, for example a near infrared ray, to a part of the subject h by a control signal.

For example, when irradiating an electromagnetic wave to a living body as the subject h, a near infrared-ray from red to infrared ray having a wavelength range of 600 nm to 1300 nm or so exhibits a high penetrating property comparing with that of electromagnetic waves of other wavelength ranges. In this wavelength range, light absorption by hemoglobin in blood is dominant.

For example, when irradiating a near infrared ray from back of a hand as the subject h and taking a picture of a transmitted light from the palm side, the electromagnetic wave is absorbed by hemoglobin in blood, so that image data, wherein a region corresponding to thick blood vessels near the palm surface is darker than region other than the region corresponding to blood vessels, is obtained.

Vein of blood vessels is acquired in the process of growing up and the shape of the blood vessels largely varies between individuals. In the present embodiment, image data obtained by taking a picture of the blood vessels is used as individually unique identification information in authentication processing.

The optical lens 1012 focuses the transmitted light from the subject h on the image pickup unit 11.

The image pickup unit 11 generates image data S11 based on the transmitted light focused by the optical lens 1012. For example, the image pickup unit 11 is composed of a CCD (charge-coupled device) type image sensor and a C-MOS (complementary metal-oxide semiconductor) type image sensor, and outputs the image data S11 to the extraction unit 102. At this time, the image data S11 may be an RGB (red, green and blue) signal or image data of other colors than that and gray-scale, etc.

The extraction unit 102 performs image processing based on the image data S11, extracts image data used for authentication, such as skeleton image data, and outputs this as a signal S102 to the authentication unit 103.

The authentication unit 103 performs matching processing with registered image data stored in advance based on the signal S102 from the extraction unit 102 and performs authentication processing.

Figure 2:
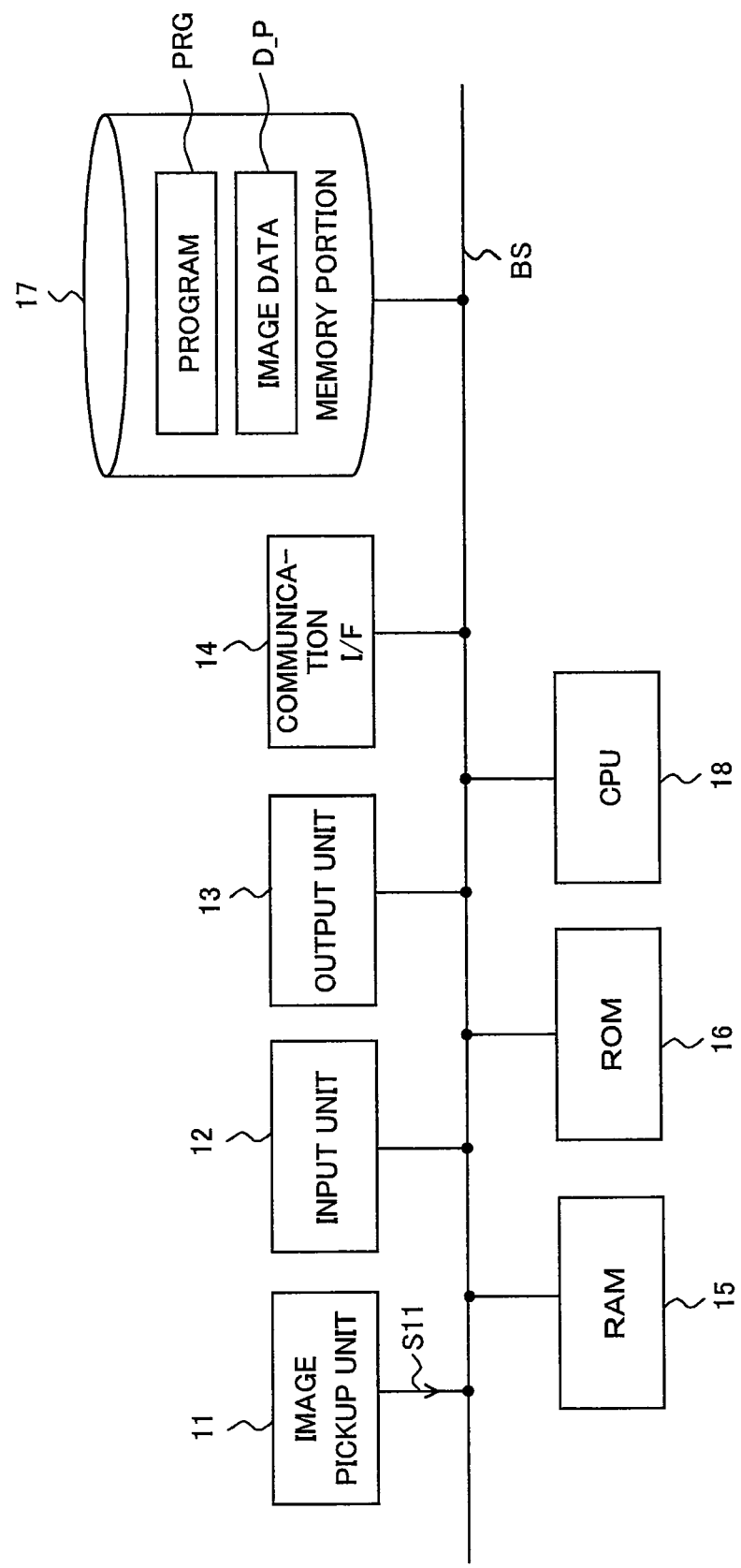
FIG. 2 is a block diagram in terms of hardware of the data processing apparatus shown in FIG. 1.

FIG. 2 is a block diagram in terms of hardware of the data processing apparatus shown in FIG. 1.

The data processing apparatus 1 comprises, for example as shown in FIG. 2, an image pickup unit 11, an input unit 12, an output unit 13, a communication interface (I/F) 14, a RAM (random access memory) 15, a ROM (read only memory) 16, a memory unit 17, and a CPU 18.

The image pickup unit 11, the input unit 12, the output unit 13, the communication interface (I/F) 14, the RAM 15, the ROM 16, the memory unit 17 and the CPU (central processing unit) 18 are connected by a bus BS.

The image pickup unit 11 is controlled by the CPU 18 and generates image data of the subject h and outputs this as a signal S11.

The input unit 12 outputs a signal, for example, in accordance with an operation of a user to the CPU 18. For example, the input unit 12 is composed of a keyboard, a mouse and a touch panel, etc.

The output unit 13 is controlled by the PCU 18 and performs outputting in accordance with predetermined data. For example, the output unit 13 is composed of a display or other display devices.

The communication interface (I/F) 14 is controlled by the CPU 18 and performs data communication with other data processing apparatuses, for example, via a not shown communication network.

The RAM 15 is for example used as a work space of the CPU 18.

The ROM 16 stores data, such as initial values and initial parameters, and the data is used by the CPU 18.

In the memory unit 17, predetermined data is written and read by the CPU 18. For example, the memory unit 17 is composed of an HDD (hard disk drive) and other memory devices.

The memory unit 17 comprises, for example as shown in FIG. 2, a program PRG and image data D_P, etc.

The program PRG includes functions according to an embodiment of the present invention, such as functions of the extraction unit 102 and the authentication unit 103, and the functions are realized by being executed by the CPU 18.

The image data D_P is image data, such as registered image data, for example, used in the authentication processing.

Figure 3:
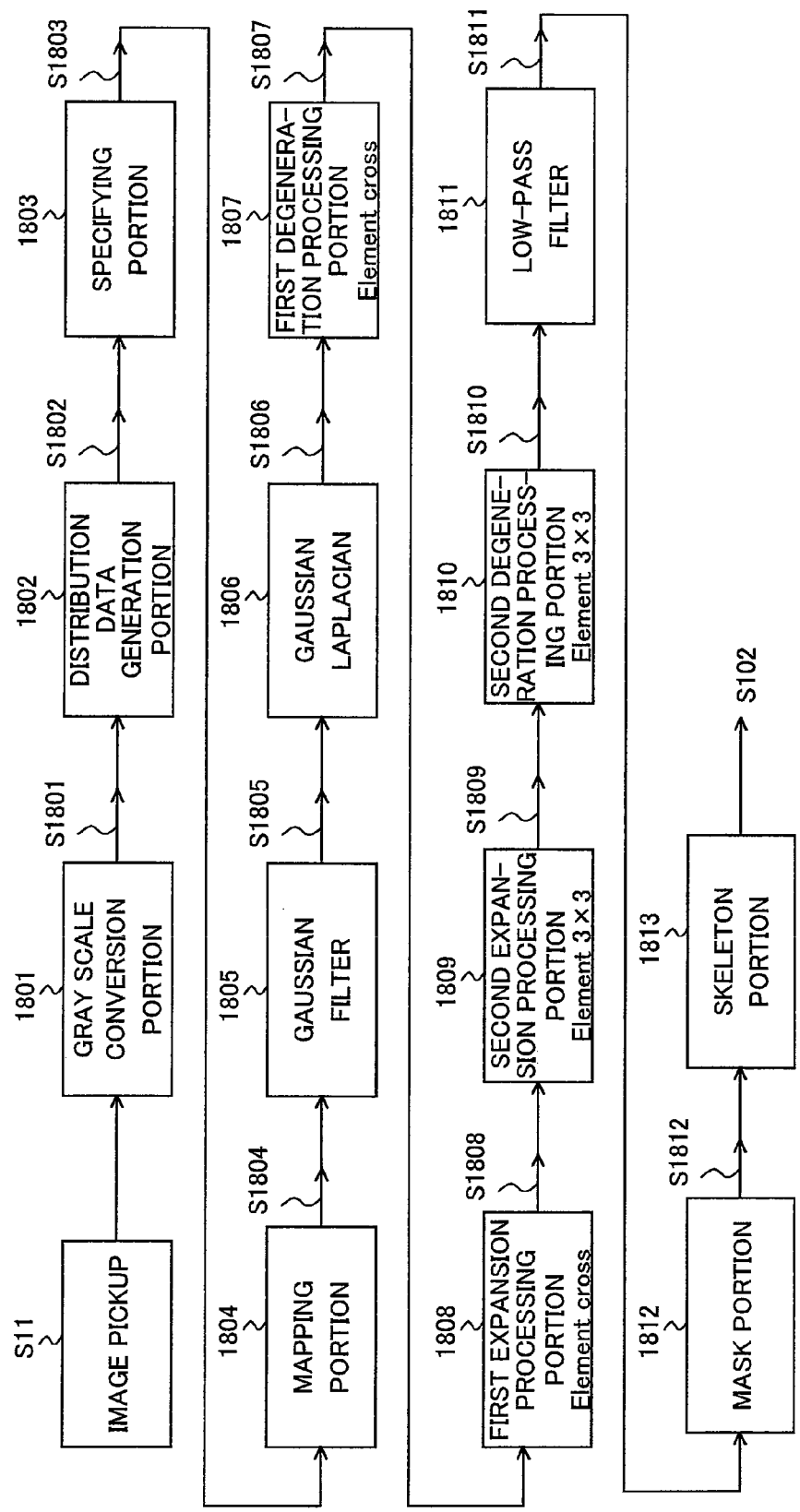
FIG. 3 is a block diagram of a function of the data processing apparatus shown in FIG. 1.

FIG. 3 is a block diagram of functions of the data processing apparatus shown in FIG. 1.

For example, the CPU 18 realizes as functions of the extraction unit 102, functions of a gray-scale conversion portion 1801, a distribution data generation portion 1802, a specifying portion 1803, a mapping portion 1804, a Gaussian filter 1805, a Gaussian Laplacian 1806, a first degeneration processing portion 1807, a first expansion processing portion 1808, a second expansion processing portion 1809, a second degeneration processing portion 18010, a low-pass filter portion 1811, a mask portion 1812 and a skeleton portion 1813, by executing the program PRG as shown in FIG. 3.

The present invention is not limited to this embodiment. For example, the functions of components shown in FIG. 3 may be realized by hardware.

The distribution data generation portion 1802 corresponds to an example of a distribution data generation means according to the present invention, and the specifying portion 1803 corresponds to an example of a specifying means according to the present invention.

The mapping portion 1804 corresponds to an example of a mapping means according to the present invention, and the low-pass filter portion 1811 corresponds to an example of a filter processing means according to the present invention.

The Gaussian filter 1805, the Gaussian Laplacian 1806, the first degeneration processing portion 1807, the first expansion processing portion 1808, the second expansion processing portion 1809, the second degeneration processing portion 1810, the low-pass filter portion 1811, the mask portion 1812 and the skeleton portion 1813 correspond to an example of a binarization means according to the present invention.

The first degeneration processing portion 1807 corresponds to a first processing means according to the present invention, the first expansion processing portion 1808 corresponds to an example of a fourth processing means according to the present invention, the second expansion processing portion 1809 corresponds to an example of a second processing means according to the present invention, and the second degeneration processing portion 1810 corresponds to an example of a third processing means according to the present invention.

The gray-scale conversion portion 1801 converts the RGB signal S11 from the image pickup unit 11 to be gray-scale and outputs as a signal S1801 to the distribution data generation portion 1802. Specifically, the gray-scale conversion portion 1801 converts the RGB signal to predetermined tones from white to black, for example, 256 tones.

In the present embodiment, the image pickup unit 11 generates the RGB signal S11 and the gray-scale conversion portion 1801 performs conversion processing to gray scale on the signal S11, but the present invention is not limited to this embodiment. For example, when the image pickup unit 11 generates gray scale image data S11, the gray scale conversion portion 1801 is not provided.

FIG. 4A to FIG. 4E are views for explaining an operation of the data processing apparatus shown in FIG. 1.

In the present embodiment, the image pickup unit 11 takes a picture of, for example, a finger of a living body of the subject h and outputs an RGB image data S11 as shown in FIG. 4A.

The gray scale conversion portion 1801 generates gray scale image data S1802, for example, as shown in FIG. 4B based on the image data S11 and outputs to the distribution data generation portion 1802.

The distribution data generation portion 1802 generates distribution data d1 indicating a distribution of pixel data based on the signal S1801 from the gray scale conversion portion 1801, for a plurality of pixel data composing image data and indicating pixel values in the first range regulated in advance, and outputs as a signal S1802 to the specifying portion 1803.

Specifically, when assuming the abscissa "c" is a value of tones (also referred to as a pixel value) and the ordinate "f" is the number of the pixel data (also referred to as a degree), the distribution data generation portion 1802 generates histogram as distribution data d1 for pixel data indicating pixel values of a range of 256 tones as a first range r1 as shown in FIG. 4C based on the signal S1801. In FIG. 4C, a small pixel value corresponds to black, and a large pixel value corresponds to white.

Specifically, the distribution data generation portion 1802 generates distribution data d1 indicating the number of pixel data having pixel values for the respective pixel values in the first range r1.

FIG. 5A and FIG. 5B are views for explaining an operation of the specifying portion shown in FIG. 3.

The specifying portion 1803 specifies, based on the signal S1802, a range with the maximum pixel value or less among the pixel values of predetermined number of pixel data in the first range r1 as a second range r2 to be binarized, and outputs this as a signal S1803.

Specifically, for example as shown in FIG. 5A, the specifying portion 1803 specifies as a second range r2 a range with the maximum pixel of value r11 or less among pixel values r11, r12, r13 and r14 by the number of predetermined threshold value V_th in the first range r1.

For example, the specifying portion 1803 specifies as a second range r2 a range with pixel values of 1 to 110 in the case of the distribution data d1 as shown in FIG. 5A.

Distribution data of pixel values of the subject h differs in each subject h. For example, comparing with image data of a subject with less fat component, the histogram d1' of image data of a subject with much fat component exhibits distribution data d1' spreading in a wide range and has a relatively high average value of pixel values as shown in FIG. 5B.

For example, in the case of the distribution data d1' as shown in FIG. 5B, the specifying portion 1803 specifies as a second range r2' a range with pixel values of not more than the maximum pixel value r11' among the pixel values r11', r12', r13' and r14' by the number of a predetermined threshold value V_th in the first range r1.

The mapping portion 1804 maps pixel data in the second range r2 specified by the specifying portion 1803 among the plurality of pixel data to the first range r1, generates second image data composed of the mapped pixel data, and outputs this as a signal S1804.

Specifically, for example, when assuming that a range of pixel values of 0 to 110 is a second range r2 as shown in FIG. 4C, the mapping portion 1804 performs mapping by enlarging the pixel data to the first range r1 as a range of pixel values of 0 to 256 as shown in FIG. 4D, enlarges the center portion in image data not including blood vessel information as shown in FIG. 4E, and generates second image data S1804.

Figure 6:
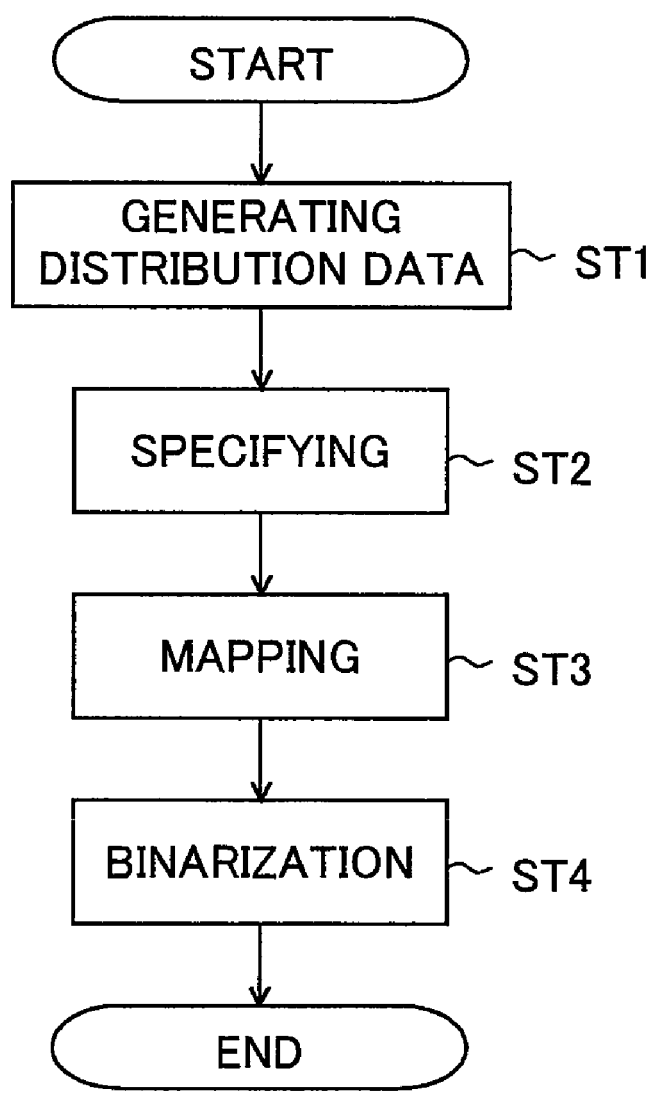
FIG. 6 is a flowchart for explaining an operation according to mapping processing of the data processing apparatus shown in FIG. 1.

FIG. 6 is a flowchart for explaining an operation according to the mapping processing of the data processing apparatus shown in FIG. 1. With reference to FIG. 4, FIG. 5A, FIG. 5B and FIG. 6, an operation of the distribution data generation portion 1802, the specifying portion 1803 and the mapping portion 1804 will be explained.

The image pickup unit 11 takes a picture of the subject h and outputs image data S11 to the gray scale conversion portion 1801. The image data S11 is converted to gray scale of 256 tones by the gray scale conversion portion 1801 and input as a signal S1801 to the distribution data generation portion 1802.

In a step ST1, for example as shown in FIG. 4C, based on the signal S1801, for a plurality of pixel data composing image data S and indicating pixel values in the first range r1 regulated in advance, the distribution data generation portion 1802 generates distribution data d1 indicating the number of pixel data having the pixel values and outputs as a signal S1802 to the specifying portion 1803.

In a step ST2, as shown in FIG. 4C, based on the signal S1802, the specifying portion 1803 specifies as a second range r2 to be binarized a range with pixel values of not more than the maximum pixel value r11 among pixel values in pixel data by the predetermined number, for example a threshold value V_th, in the first range r1, and outputs as a signal S1803 to the mapping portion 1804.

In a step ST3, as shown in FIG. 4D, the mapping portion 1804 maps pixel data in the second range r2 specified by the specifying portion 1803 among the plurality of pixel data to the first range r1 based on the signal S1803, generates second image data composed of the mapped pixel data and outputs as a signal S1804.

In a step ST4, the second image data S1804 generated in the mapping portion 1804, for example, by later explained components 1085 to 1812, etc. is binarized based on the regulated threshold value regulated in the first range r1, for example 100 tones, and generates third image data.

As explained above, in the present embodiment, for example as shown in FIG. 4C and FIG. 4D, as a result that distribution data is generated by the distribution data generation portion 1802, a second range is specified by the specifying portion 1803, the pixel data in the second range is mapped to the first range by the mapping portion 1804, and image data is generated by binarization based on a threshold value regulated in the first range r1 by the later explained components 1805 to 1812; binarization processing can be suitably performed even when distribution data d1 differs in each subject h.

Also, since the pixel data in the specified second range is mapped to the first range, the contrast becomes high and binarization processing can be suitably performed.

The data processing apparatus 1 according to the present embodiment performs edge enhancement processing after performing noise removing processing on the image data generated in the above steps. For example, the data processing apparatus 1 performs any processing among a plurality of different noise removing processing based on the signal S1804, and performs edge enhancement processing after the noise removing processing.

Figure 7:
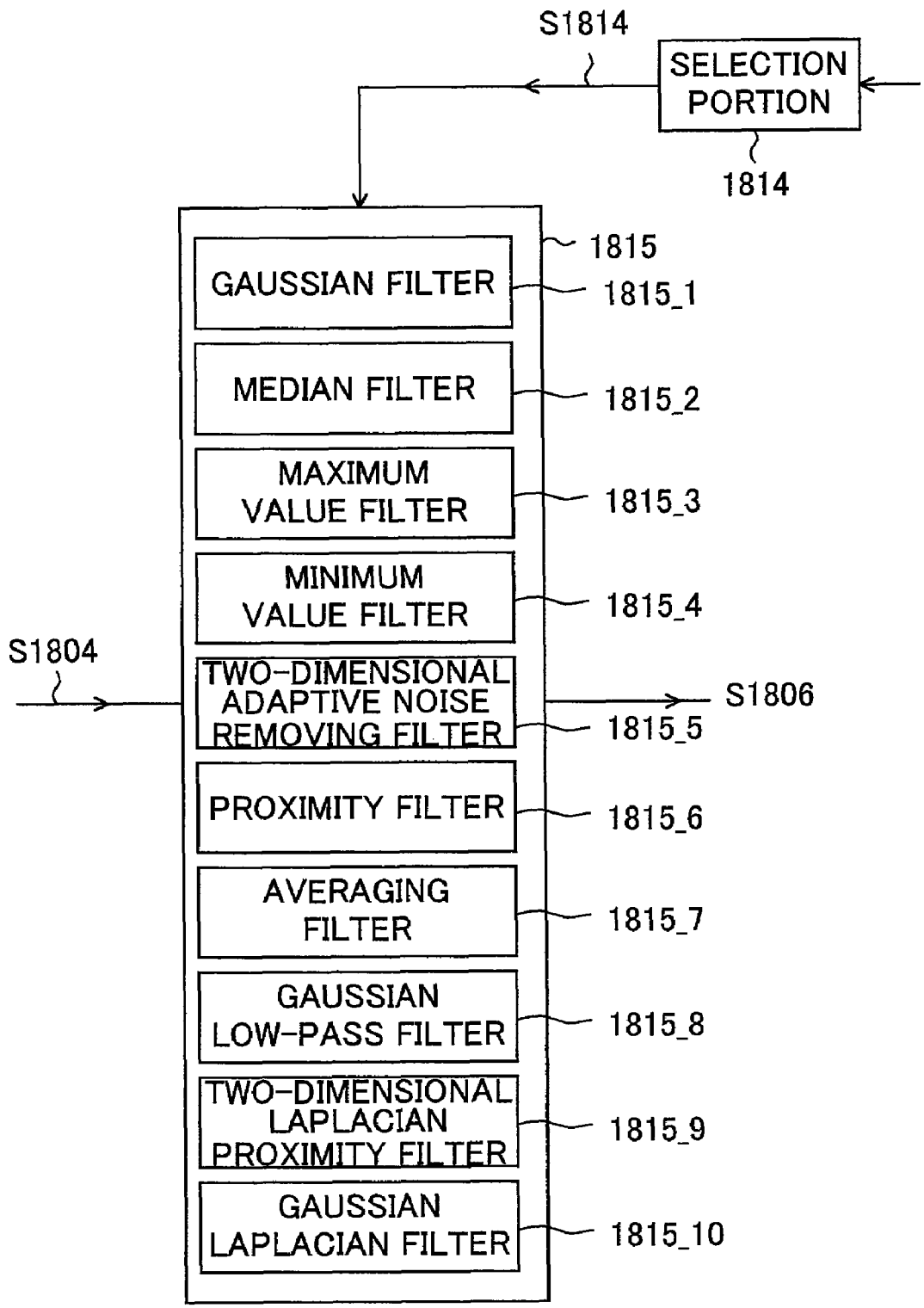
FIG. 7 is a block diagram of a function according to filter processing of the data processing apparatus shown in FIG. 1.

FIG. 7 is a block diagram of a function according to filter processing of the data processing apparatus shown in FIG. 1.

The CPU 18 realizes functions of a selection portion 1814 and a plurality of noise removing filters 1815 shown in FIG. 7, for example, by executing the program PRG.

The noise removing filter 1815 corresponds to an example of a noise removing means according to the present invention.

The selection portion 1814 outputs to the noise removing filter 1815 a signal S1814 for selecting any noise removing filter among a plurality of noise removing filters for performing different noise removing processing among the noise removing filter 1815.

For example, the selection portion 1814 detects noise distribution characteristics of the signal S1804 and outputs a signal S1814 for selecting a noise removing filter suitable to the noise characteristics based on the detection result.

Also, for example, the selection portion 1814 may output a signal S1814 for selecting the noise removing filter based on the signal from the input unit 12 in accordance with an operation of a user.

The noise removing filter 1815 comprises a plurality of filters for noise removing processing, for example, a Gaussian filter 1815_1, a median filter 1815_2, a maximum value filter 1815_3, a minimum value filter 1815_4, a two-dimensional adaptive noise removing filter 1815_5, a proximity filter 1815_6, an averaging filter 1815_7, a Gaussian low-pass filter 1815_8, a two-dimensional Laplacian proximity filter 1815_9, and a Gaussian Laplacian filter 1815_10; selects any (at least one) noise removing filter, for example, in accordance with the signal S1814 from the selection portion 1814, performs noise removing processing on the signal S1804 with the selected noise removing filter, and generates image data S1806.

Below, the filter processing will be explained. Generally, filter processing is performed with a filter h (n1, n2) on image data u (n1, n2), wherein a grid point (n1, n2) on the two-dimensional plane is a variable, and image data v (n1, n2) is generated as show in the formula (1). Here, convolution integral is indicated as "*".

$$v(n_1, n_2) = \qquad (1)$$
$$u(n_1, n_2) * h(n_1, n_2) = \sum_{m1}\sum_{m2} h(m_1, m_2)u(n_1 - m_1, n_2 - m_2) =$$

-continued $$\sum_{m1}\sum_{m2} u(m_1, m_2)h(n_1 - m_1, n_2 - m_2)$$

The Gaussian filter 1815_1 performs convolution processing on a Gauss function hg (n1, n2) as shown in the formula (2), for example, by using a standard deviation σ. Specifically, as shown in the formulas (3) and (1), noise removing processing is performed by using the Gaussian filter h (n1, n2).

$$h_g(n_1, n_2) = e^{-(n_1^2+n_2^2)/(2\sigma^2)} \quad (2)$$

$$h(n_1, n_2) = \frac{h_g(n_1, n_2)}{\sum_{n1}\sum_{n2} h_g} \quad (3)$$

Figure 8:
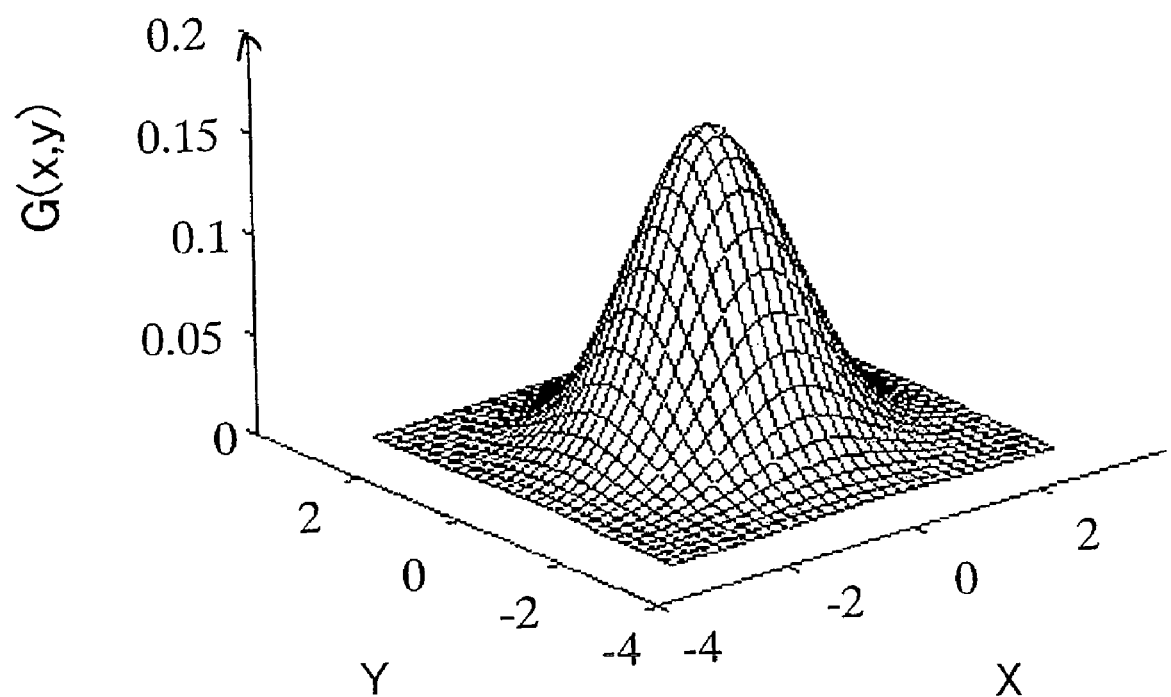
FIG. 8 is a view for explaining a Gaussian filter.

FIG. 8 is a view for explaining a Gaussian filter.

The Gaussian filter 1815_1 is a smoothing filter and performs smoothing processing by calculating by weighting in accordance with a two dimensional Gauss distribution, wherein focused pixel data is at the center, for example, as shown in FIG. 8. For example, focused pixel data is (0,0) in FIG. 8.

For example, when arranging pixel data in a local region of n×n, wherein the focused pixel data is at the center, the median filter 1815_2 uses a pixel value of the pixel data in the middle of the order as a pixel value of the focused pixel data.

The maximum value filter 1815_3 uses a pixel value of the maximum value as a pixel value of the focused pixel data, for example, among pixel data of a local region of n×n, wherein the focused pixel is at the center.

The minimum value filter 1815_4 uses a pixel value of the minimum value as a pixel value of the focused pixel data, for example, among pixel data of a local region of n×n, wherein the focused pixel is at the center.

The two-dimensional adaptive noise removing filter 1815_5 is, for example, a so-called Wiener filter and performs filter processing to minimize a mean square error with respect to image data based on the image data to improve the image.

The proximity filter 1815_6 is filter processing for calculating an output pixel based on a pixel value of, for example, n×n pixel among image data. Specifically, for example, the proximity filter 1815_6 performs filter processing based on the maximum value, minimum value and standard deviation from a proximity value in accordance with the data.

The averaging filter 1815_7 performs filter processing by calculating an average value of pixel values of, for example, n×n pixel among the image data and using the same as an output pixel.

The Gaussian low-pass filter 1815_8 performs noise removing and smoothing processing. Specifically, the Gaussian low-pass filter 1815_8 performs smoothing processing on image data based on Gaussian type weighting.

The two-dimensional Laplacian proximity filter 1815_9 performs second-order differential processing to perform edge detection based on the image data.

The Gaussian Laplacian filter 1815_10 performs filter processing wherein a Gaussian filter calculates a Laplacian (second-order differential). A detailed explanation will be given below.

The Laplacian can be expressed, for example, as shown in the formula (4) in the two-dimension Euclidean coordinate system.

$$\nabla^2 = \frac{\partial^2}{\partial x^2} + \frac{\partial^2}{\partial y^2} \quad (4)$$

Also, the Laplacian can be expressed in matrix of 3×3 as shown in the formula (5), for example, by using a predetermined value α. Here, the focused pixel is made to be the center of the matrix.

$$\nabla^2 = \frac{4}{(a+1)}\begin{bmatrix} \frac{a}{4} & \frac{1-\alpha}{4} & \frac{\alpha}{4} \\ \frac{1-a}{4} & -1 & \frac{1-\alpha}{4} \\ \frac{\alpha}{4} & \frac{1-\alpha}{4} & \frac{\alpha}{4} \end{bmatrix} \quad (5)$$

The Laplacian of a Gaussian filter performs convolution processing on the Gauss function hg (n1, n2) as shown in the formula (6), for example, by using the standard deviation σ. Specifically, as shown in the formulas (7) and (1), noise removing processing is performed by using the Gaussian Laplacian filter h (n1, n2).

$$h_g(n_1, n_2) = e^{-(n_1^2+n_2^2)/(2\sigma^2)} \quad (6)$$

$$h(n_1, n_2) = \frac{(n_1^2 + n_2^2 - 2\sigma^2)h_g(n_1, n_2)}{2\pi\sigma^6 \sum_{n1}\sum_{n2} h_g} \quad (7)$$

Also, the Laplacian of the Gaussian filter can be expressed, for example, as shown in the formula (8) when expressed in matrix by using a predetermined value α. Here, the focused pixel is made to be at the center of the matrix.

$$\frac{1}{(a+1)}\begin{bmatrix} -\alpha & \alpha-1 & -\alpha \\ \alpha-1 & \alpha+5 & \alpha-1 \\ -\alpha & \alpha-1 & -\alpha \end{bmatrix} \quad (8)$$

FIG. 9A to FIG. 9F are views for explaining a Gaussian Laplacian filter. For a plane explanation, the image data is assumed to be one-dimensional.

An edge is a boundary of a plane and a plane generated by a change of pixel values (brightness). An edge can be detected by performing spatial differential. For example, there are first-order differential and second-order differential.

For example, the case of a step-shaped pixel value f(x) shown in FIG. 9A will be explained. Here, the ordinate axis is a pixel value and the abscissa axis is the x-axis.

Specifically, an edge region continuously changes with a predetermined width L between the first pixel value f1 and the second pixel value f2 as shown in FIG. 9B. When assuming that the image data f(x) is first-order differential processing, it sharply changes at a predetermined width L in the boundary region, for example, as shown in FIG. 9C.

For example, edge detection processing detects an abrupt change of image f'(x) after the first-order differential processing and specifies the edge.

Also, the edge detection processing may perform detection by quadratic differential processing (Laplacian).

For example, in the case where image data is a pixel value f(x) shown in FIG. 9D, a first-order differential value f'(x)

shown in FIG. 9E and a second-order differential value f"(x) shown in FIG. 9F shown in FIG. 9F are obtained.

The second-order differential value f"(x) changes its sign at a point where tilt is the largest on a slope of the edge. Accordingly, a point where the second-order differential crosses with the x-axis (referred to as a zero cross point) P_cr indicates the edge position. The image data is two-dimensional data and specifies as an edge a position of the zero crossing point P_cr among image data subjected to second-order differential processing at the time of actual edge detection.

For example, the case where the selection portion 1814 selects the Gaussian filter 1815_1 and the Gaussian Laplacian filter 1815_10 for noise removing processing will be explained. For example as shown in FIG. 3, it is assumed that a Gaussian filter 1805 is the Gaussian filter 1815_1 and a Gaussian Laplacian filter 1806 is the Gaussian Laplacian filter 1815_10.

Figure 10A:
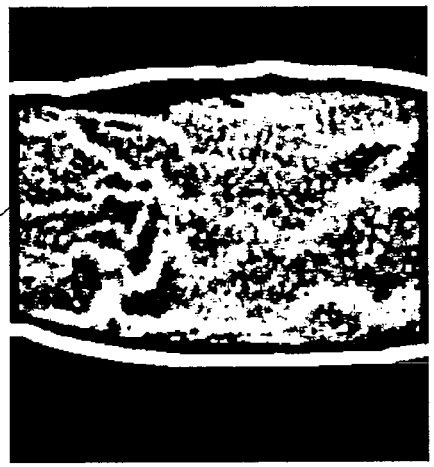
FIG. 10A to FIG. 10C are views for explaining noise removing processing of the data processing apparatus shown in FIG. 1.
Figure 10B:
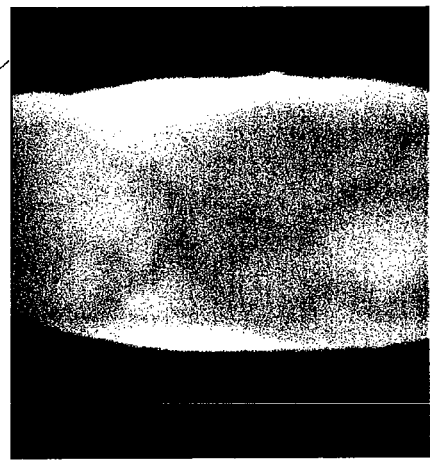
Figure 10C:
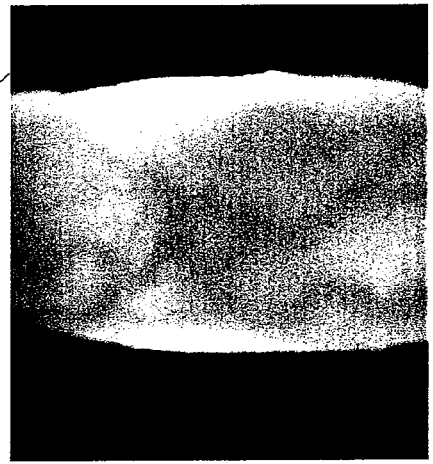
Figure 11:
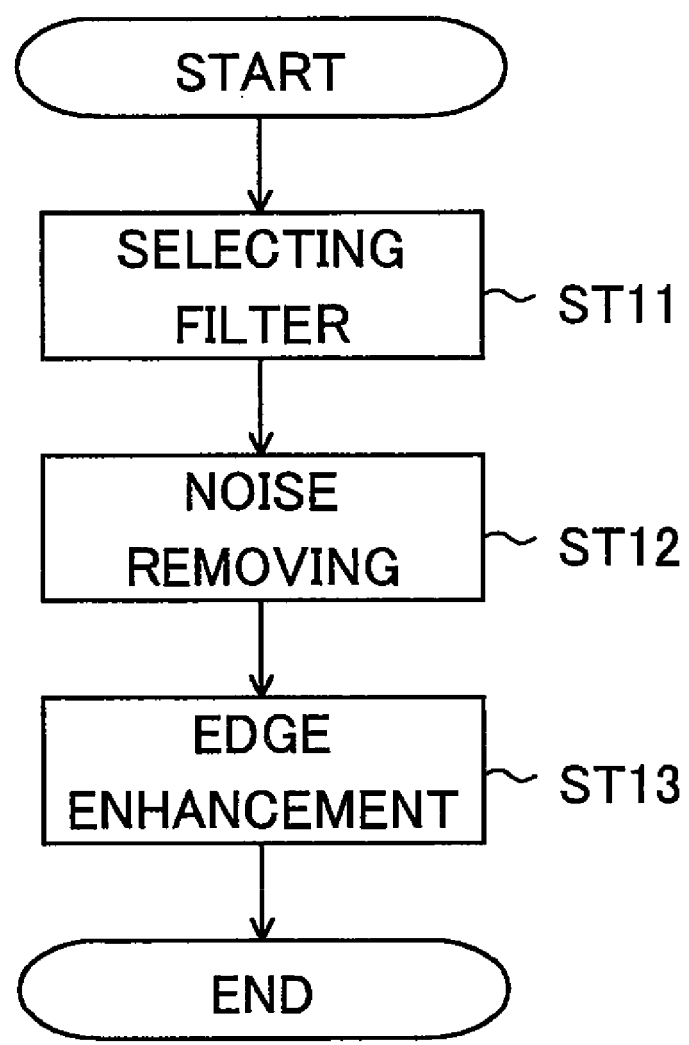
FIG. 11 is a flowchart for explaining an operation of the data processing apparatus shown in FIG. 1.

FIG. 10A to FIG. 10C are views for explaining noise removing processing of the data processing apparatus shown in FIG. 1. FIG. 11 is a flowchart for explaining an operation of the data processing apparatus shown in FIG. 1. With reference to FIG. 10A to FIG. 10C and FIG. 11, an operation of the data processing apparatus, particularly an operation regarding noise removing processing will be explained.

In a step ST11, for example, the selection portion 1814 detects noise distribution characteristics of a signal S1804 and outputs a signal S1814 to select a noise removing filter suitable to the noise characteristics based on the detected results to the noise removing filter 1815. For example, the selection portion 1814 outputs to the noise removing filter 1815 a signal S1814 to select the Gaussian filter 1815_1 and the Gaussian Laplacian filter 1815_10 for the noise removing processing.

In a step ST12, any (at least one) noise removing filter is selected based on the signal S1814 in the noise removing filter 1815, noise removing processing is performed on the signal S1814 by the selected noise removing filter, and image data S1806 is generated.

For example, the noise removing filter 1815 selects the Gaussian filter 1815_1 and the Gaussian Laplacian filter 1815_10. For convenience of the explanation, the Gaussian filter 1815_1 and the Gaussian Laplacian filter 1815_10 are respectively explained as the Gaussian filter 1805 and the Gaussian Laplacian filter 1806.

In the step ST12, the Gaussian filter 1805 performs noise removing processing shown in the formulas (1) and (3), for example, based on the signal S1804 shown in FIG. 10A, generates image data S1805, for example, shown in FIG. 10B, and outputs to the Gaussian Laplacian filter 1806.

In a step ST13, the Gaussian Laplacian filter 1806 performs edge enhancement processing based on the signal S1805, for example, as shown in FIG. 10B, generates image data S1806, for example, as shown in FIG. 10C, and outputs the same. The image data S1806 is binarized image data.

The Gaussian Laplacian filter 1806 performs binarization processing based on a threshold value regulated in the first range r1, for example shown in FIG. 4C, when performing binarization processing.

As explained above, as a result that the selection portion 1814 for selecting any noise removing processing among a plurality of noise removing processing and as noise removing filters 1815, for example, the Gaussian filter 1815_1, the median filter 1815_2, the maximum value filter 1815_3, the minimum value filter 1815_4, the two-dimensional adaptive noise removing filter 1815_5, the proximity filter 1815_6, an averaging filter 1815_7, the Gaussian low-pass filter 1815_8, the two-dimensional Laplacian proximity filter 1815_9, and the Gaussian Laplacian filter 1815_10 are provided; and, for example, a filter selected by the selection portion 1814 performs the noise removing processing based on the signal S1804; then, edge enhancement processing is performed by the Gaussian Laplacian filter 1806 for binarization; it is possible to generate suitably binarized image data based on the predetermined threshold value of the first range r1 by removing, for example, noises caused by diffused reflection of a body of a subject h, the image pickup unit 11 and other devices, from the image data S1804.

Also, since the selection portion 1814 selects a filter in accordance with the noise characteristics, noises can be removed with high accuracy.

Also, for example, by performing Gaussian filter processing and Gaussian Laplacian filter processing on the image data generated by taking a picture of light transmitted through a part including blood vessels of the subject h, noises can be removed with high accuracy, binarization processing can be suitably performed and it is possible to generate an image wherein a pattern indicating blood vessels can be visually recognized.

FIG. 12A to FIG. 12D are schematic views for explaining an operation of the data processing apparatus shown in FIG. 1.

Figure 12A:
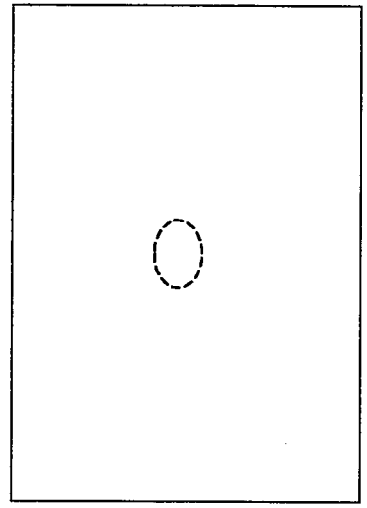
FIG. 12A to FIG. 12D are schematic views for explaining an operation of the data processing apparatus shown in FIG. 1.
Figure 12B:
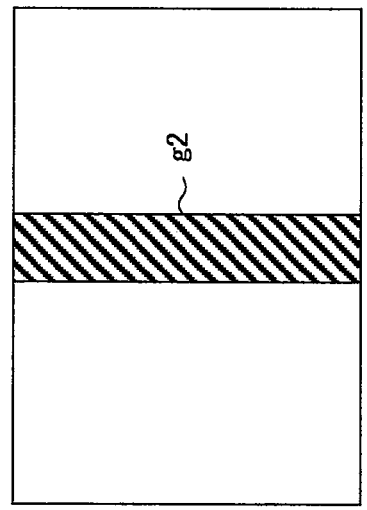

The data processing apparatus 1 according to the present embodiment performs removing processing as shown in FIG. 12B on a pixel of a noise component which is smaller than a predetermined sized region ar_th1, for example, as shown in FIG. 12A based on the binarized image data S1806 generated in the above processing.

Figure 12C:
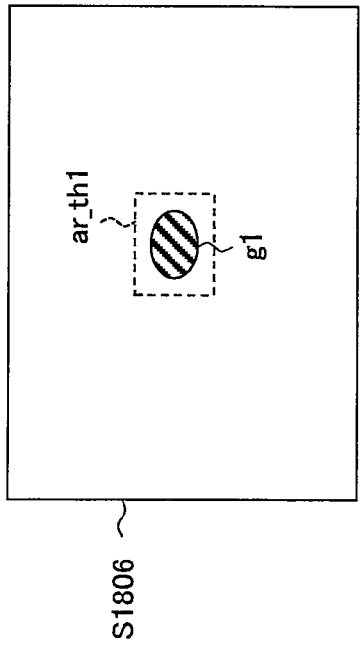
Figure 12D:
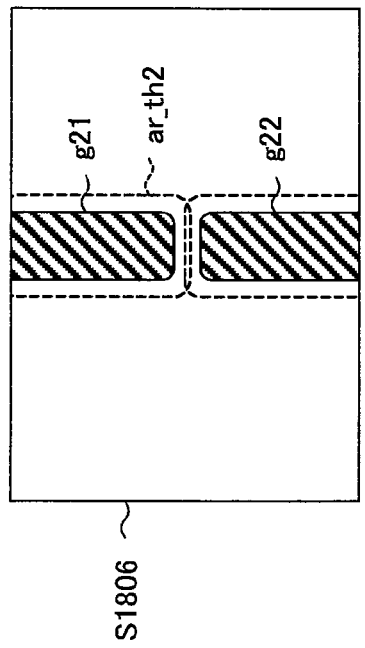

Also, the data processing apparatus 1 performs processing of connecting pixel data g21 and g22 having the same pixel value within a predetermined distance ar_th2, for example, based on the binarized image data S1806 shown in FIG. 12C, and generates image data having a linear pattern g2, for example, shown in FIG. 12D. In the present embodiment, the linear patter corresponds to an example of a pattern indicating blood vessels.

Specifically, the data processing apparatus 1 performs degeneration processing by using the minimum pixel data among pixel data in the first region around the pixel data as predetermined pixel data for each of a plurality of pixel data composing image data and indicating pixel values, and expansion processing by using the maximum pixel data among pixel data in the second region being larger than the first region around the pixel data as predetermined pixel data for each pixel data by the degeneration processing; and generates image data including a linear pattern.

In the present embodiment, the above functions are realized, for example, by using the Morphology function.

FIG. 13A to FIG. 13F are views for explaining the degeneration processing and expansion processing of the data processing apparatus shown in FIG. 1.

Based on the image data S1806, for each of the plurality of pixel data composing the image data S1806 and indicating pixel values, a first degeneration (erode) processing portion 1807 generates image data S1807 by using the minimum pixel data among pixel data in the first region around the pixel data as predetermined pixel data, and output this to the first expansion processing portion 1808.

Specifically, for example as shown in FIG. 13A, the first degeneration processing portion 1807 uses the minimum pixel data among pixel data in a cross-shaped element EL1 as a first region, wherein focused pixel data g_att is at the center, as a pixel value of the focused pixel data g_att. In the present embodiment, as shown in FIG. 13B, the minimum value "0" is used as the focused pixel data g_att.

Based on the image data S1807, for each of a plurality of pixel data composing the image data S1807 and indicating pixel values, the first expansion (dilate) processing portion 1808 generates image data S1808 by using the maximum pixel data among pixel data in the first region around the pixel data as predetermined pixel data, and outputs the same to the second expansion processing portion 1809.

Specifically, for example as shown in FIG. 13A, the first expansion processing portion 1808 uses the maximum pixel data among pixel data in the cross-shaped element EL1 as a first region, wherein the focused pixel data g_att is at the center, as a pixel value of the focused pixel g_att. In the present embodiment, as shown in FIG. 13C, the maximum value 1 is used as the focused pixel data g_att.

Based on the image data S1808, for each of a plurality of pixel data composing the image data S1808 and indicating a pixel value, the second expansion processing portion 1809 generates image data S1809 by using as predetermined pixel data the maximum pixel data among pixel data in the second region being larger than the first region around the pixel data, and outputs to the second degeneration processing portion 1810.

Specifically, the second expansion processing portion 1809 uses as a pixel value of the focused pixel g_att the maximum pixel data among pixel data in a 3×3 rectangular shaped element EL2, wherein the focused pixel data g_att is at the center, as a second region being larger than the first region, for example as shown in FIG. 13D. In the present embodiment, for example as shown in FIG. 13E, the maximum value 1 is used as the focused pixel data g_att.

In the present embodiment, an explanation will be made by taking a 3×3 element as an example, but the present invention is not limited to the embodiment. For example, it may be a desired size of 5×5 and 7×7, etc.

Based on the image data S1809, for each of a plurality of pixel data composing the image data S1809 and indicating pixel values, the second degeneration processing portion 1810 generates image data S1810 by using as predetermined pixel data the minimum pixel data among pixel data in the second region being larger than the first region around the pixel data.

Specifically, the second degeneration processing portion 1810, for example as shown in FIG. 13D, the minimum pixel data among pixel data in the 3×3 rectangular element EL2, wherein the focused pixel data g_att is at the center, as the second region being larger than the first region, is used as a pixel value of the focused pixel g_att. In the present embodiment, as shown in FIG. 13F, the minimum value 0 is used as the focused pixel data g_att.

Figure 14A:
FIG. 14A to FIG. 14C are views for explaining an operation of the data processing apparatus shown in FIG. 1.
Figure 14B:
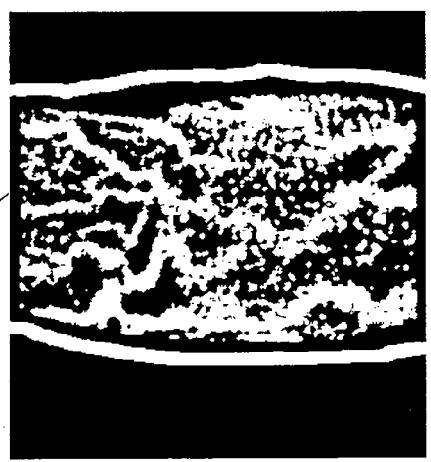
Figure 14C:
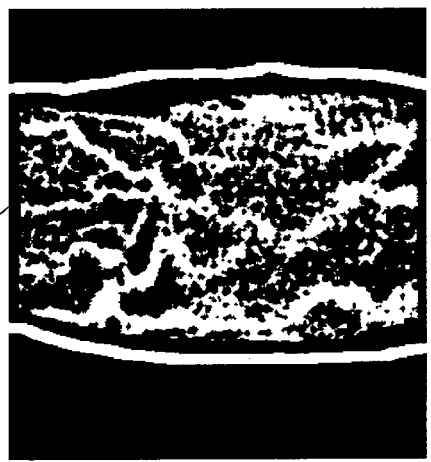
Figure 15:
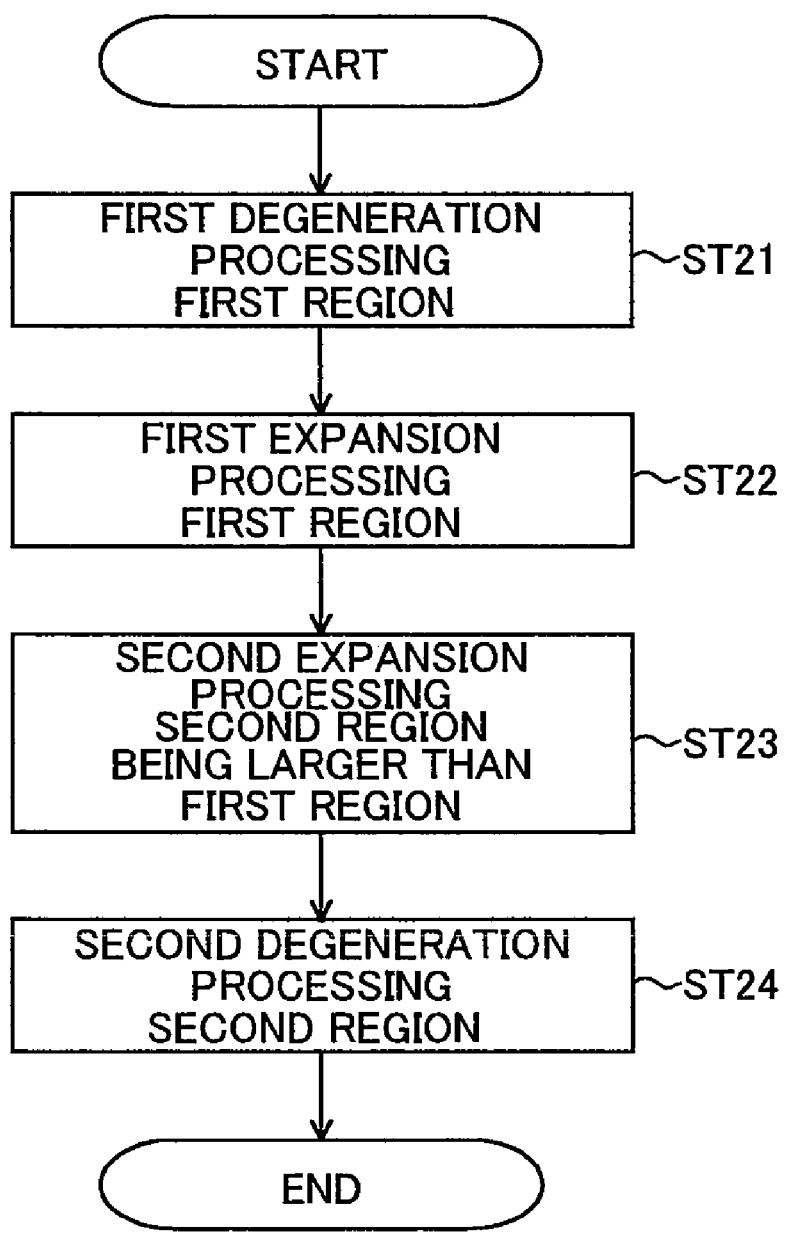
FIG. 15 is a flowchart for explaining an operation of the data processing apparatus shown in FIG. 1.

FIG. 14A to FIG. 14C are views for explaining an operation of the data processing apparatus shown in FIG. 1. FIG. 15 is a flowchart for explaining an operation of the data processing apparatus shown in FIG. 1. With reference to FIG. 10C, FIG. 14A to FIG. 14C and FIG. 15, an operation of the data processing apparatus will be explained by particularly focusing on degeneration processing and expansion processing.

In a step ST21, based on the image data S1806, for example shown in FIG. 10C, the first degeneration processing portion 1807 generates image S1807 as shown in FIG. 14A by using as a pixel value of the focused pixel g_att the minimum pixel data among pixel data in a cross-shaped element EL1 as the first region, wherein the focused data is at the center, for example as shown in FIG. 13A.

As a result of the first degeneration processing, the first degeneration processing portion 1807 generates image data S1807, wherein pixel data being smaller than a predetermined size is removed.

In a step ST22, based on the image data S1807, for example shown in FIG. 14A, the first expansion processing portion 1808 generates image data S1808 shown in FIG. 14B by using as a pixel value of the focused pixel g_att the maximum pixel data among pixel data in the cross-shaped element EL1 as the first region, wherein the focused pixel data g_att is at the center, for example as shown in FIG. 13A.

In a step ST23, based on image data S1808, for example shown in FIG. 14B, the second expansion processing portion 1809 generates image data S1808 by using as a pixel value of the focused pixel g_att the maximum pixel data among pixel data in a 3×3 rectangular shaped element EL2, wherein the focused pixel data g_att is at the center, as a second region being larger than the first region, for example as shown in FIG. 13D.

From the processing in the above steps ST22 and ST23, the first expansion processing portion 1808 and the second expansion processing portion connect pixel data having the same pixel value within a predetermined distance ar_th2 and generates image data having a linear pattern.

In a step ST24, for example based on image data S1809, the second degeneration processing portion 1810 generates image data S1810, for example, as shown in FIG. 14C by using as a pixel value of the focused pixel g_att the minimum pixel data among pixel data in a 3×3 rectangular shaped element EL2, wherein the focused pixel data g_att is at the center, as a second region being larger than the first region, for example as shown in FIG. 13D.

As explained above, for each of a plurality pixel data composing the image data S1806 and indicating pixel values, the first degeneration processing portion 1807 for generating image data S1807 by using as predetermined pixel data the minimum pixel data among pixel data in the first region around the pixel data, the first expansion processing portion 1808 for generating image data S1808 by using as predetermined pixel data the maximum pixel data among pixel data in the first region around the pixel data, the second expansion processing portion 1809 for generating image data S1809 by using as predetermined pixel data the maximum pixel data among pixel data in the second region being larger than the first region around the pixel data, and the second degeneration processing portion 1810 for generating image data S1810 by using as predetermined pixel data the minimum pixel data among pixel data in the second region being larger than the first region around the pixel data; it is possible to leave a linear pattern and fine pattern can be removed as noise components.

The low-pass filter portion 1811 performs filter processing for leaving a linear pattern, for example, based on the image data S1810 and generates image data S1811.

Specifically, the low-pass filter portion 1811 specifies low frequency component data than a threshold value for leaving the linear pattern by frequency components in the two-dimensional Fourier space obtained by performing two-dimensional Fourier transform processing on the image data S1810, performs inverse two-dimensional Fourier transform processing on the specified data, and generates image data S1811.

FIG. 16A to FIG. 16F are views for explaining an operation of first low-pass filter processing of the data processing apparatus shown in FIG. 1. With reference to FIG. 16A to FIG. 16F, an operation of the low-pass filter portion 1811 will be explained.

The low-pass filter portion 1811 according to the present embodiment performs low-pass filter processing by changing a threshold value for a plurality of times, for example three times, for highly accurately extracting a linear pattern.

A threshold value of frequency components for leaving the linear pattern will be explained.

Figures 16A, 16B, 16C:
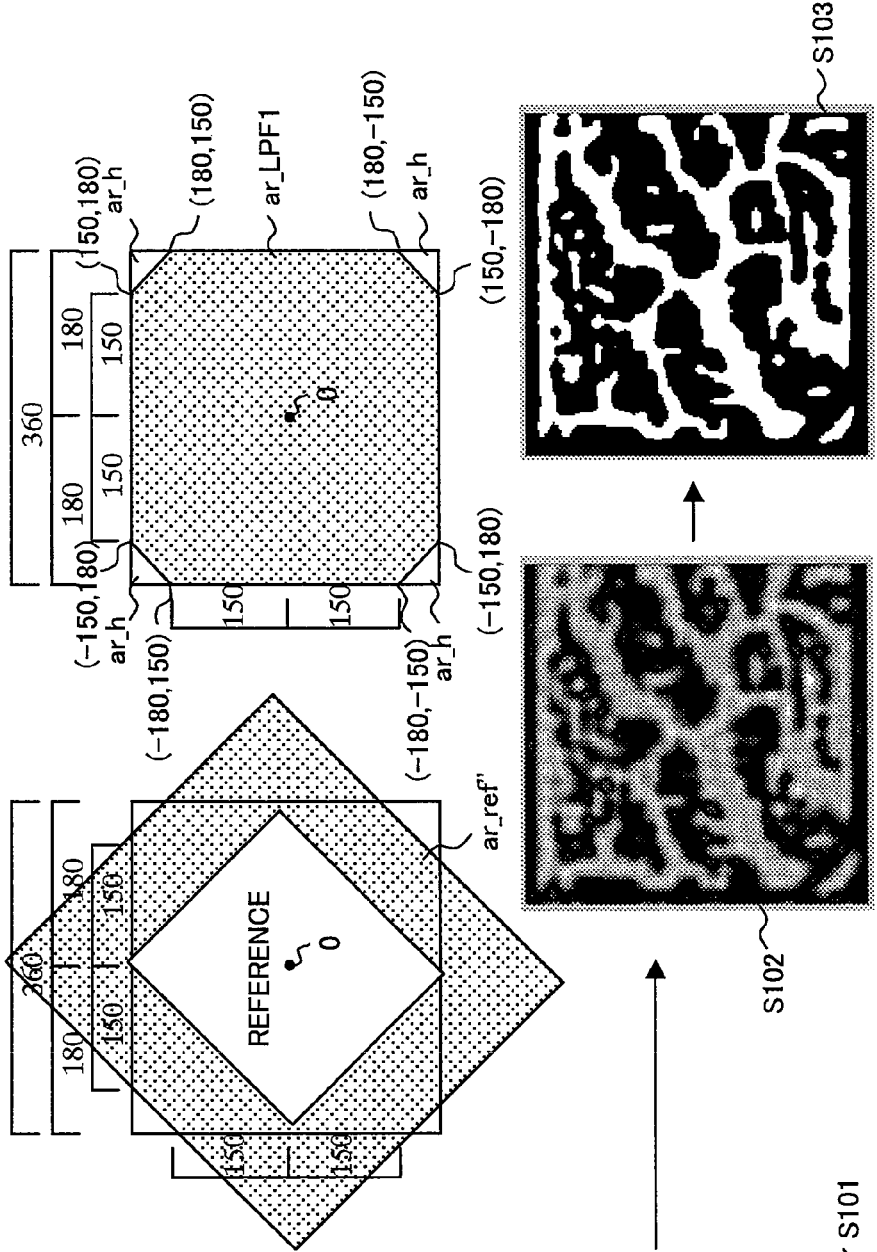
FIG. 16A to FIG. 16F are views for explaining an operation of a first low-pass filter processing of the data processing apparatus shown in FIG. 1.

For example, when assuming that the abscissa axis is x components in the Fourier space and the ordinate axis is y components in the Fourier space, the low-pass filter portion 1811 sets a region ar_ref to be a reference of a threshold value in the Fourier space as shown in FIG. 16A.

In the present embodiment, for example as shown in FIG. 16A, a rhombic reference region ar_ref is set in the 360×360 Fourier space, wherein the origin point O is set to be the center. As shown in FIG. 16B, a region ar_ref' including the reference region ar_ref and obtained by enlarging the reference region by a predetermined magnification is set, and the region ar_ref' is used as a low-pass filter.

In the first low-pass filter processing, for example as shown in FIG. 16C, a low-pass filter ar_LPF1 is set, so that a region ar_h indicating high frequency components is cut in the Fourier space. The region ar_h corresponds, for example, to a geometrically symmetric pattern and an approximate circular pattern, etc. in an real-space. By cutting the region ar_h, the above geometrically symmetric pattern can be removed.

As the threshold value, for example as shown in FIG. 16C, a region ar_LPF1 surrounded by (180, 150), (150, 180), (−150, 180), (−180, 150), (−180, −150), (−150, 180), (150, −180) and (180, −150) in the two-dimensional Fourier space is set. The region ar_LPF1 corresponds, for example, to a linear pattern in an actual space. By specifying the region ar_LPF1, the linear pattern can be specified.

Figure 16D:
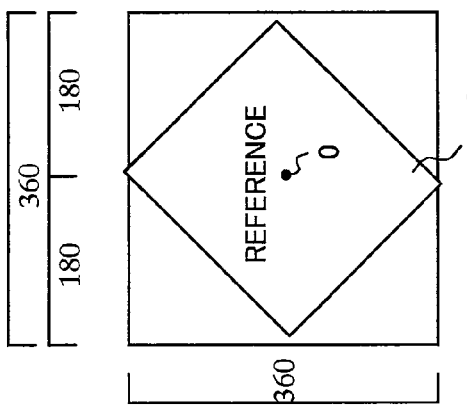
Figure 16E:
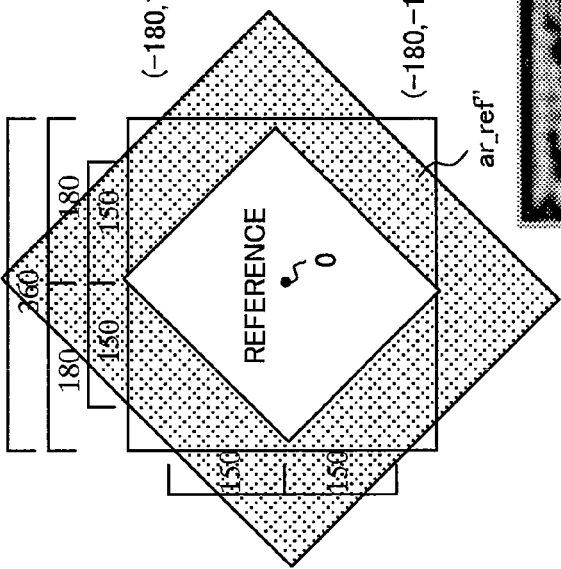
Figure 16F:
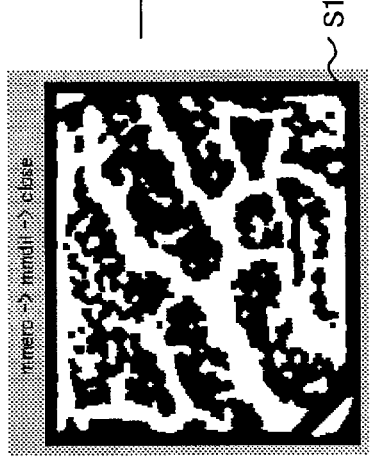

The low-pass filter portion 1811 specifies low frequency component data in the region ar_LPF1 in the Fourier space as shown in FIG. 16C based on image data S101, for example shown in FIG. 16D, as the image data. For example, when the specified low frequency component data is subjected to inverse two-dimensional Fourier transform processing, for example, an image S102 shown in FIG. 16E is obtained. For example, a pixel value of the image data S102 is subjected to binarization processing (for example, rounding up 6 or more and rounding off 5 or less), image data S103 shown in FIG. 16F is obtained.

FIG. 17A to FIG. 17E are views for explaining an operation of second low-pass filter processing of the low-pass filter portion.

The low-pass filter portion 1811 sets a region being larger than the region ar_LPF1 as a threshold value of low-pass filter processing and performs filter processing for a plurality of times.

Figures 17A, 17B, 17C, 17D, 17E:
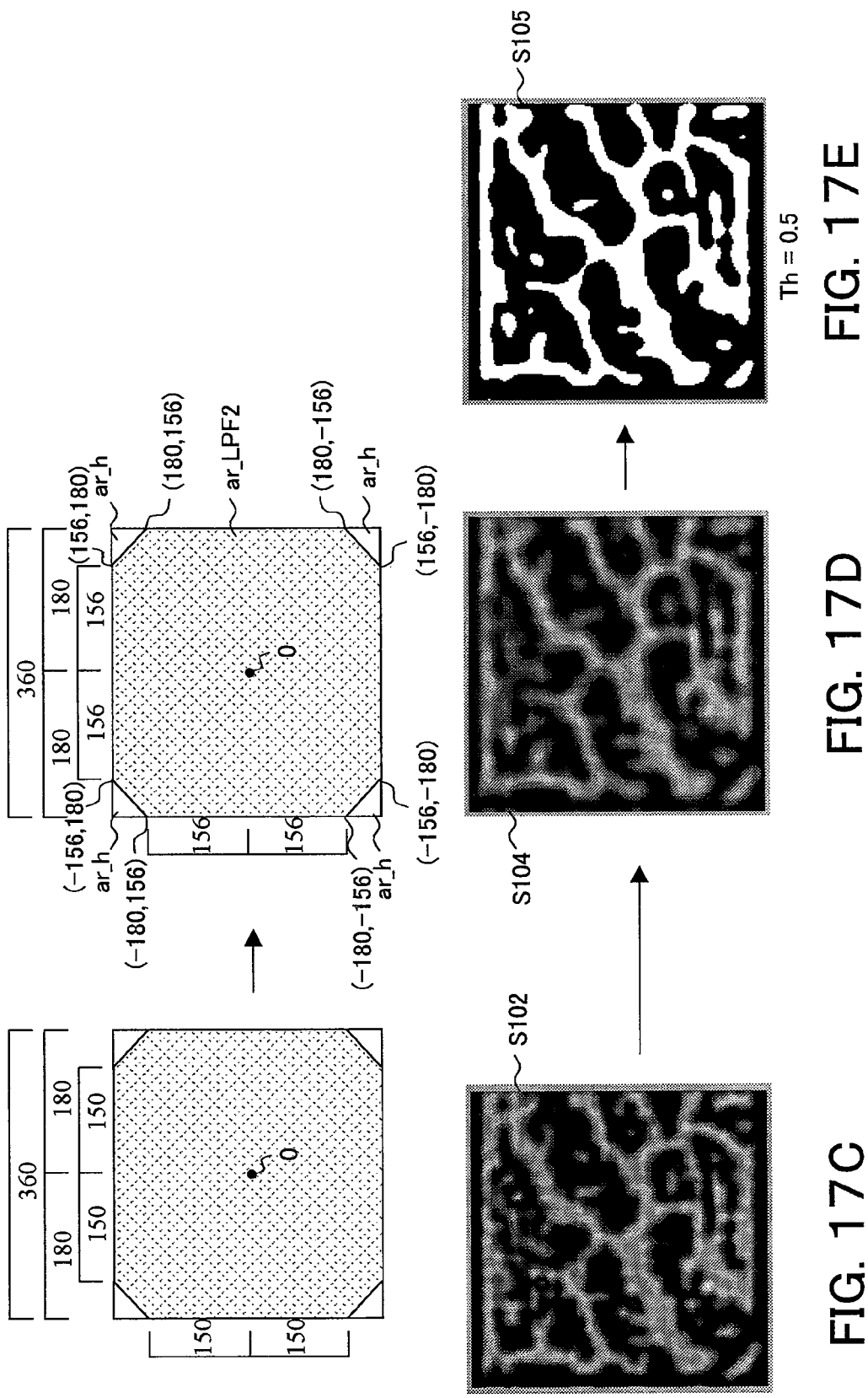
FIG. 17A to FIG. 17E are views for explaining an operation of second low-pass filter processing of a low-pass filter portion.

The low-pass filter portion 1811 sets a region being larger than the region ar_LPF1, for example, shown in FIG. 17A as explained above, such as a region ar_LPF2, for example, shown in FIG. 17B.

In the second low-pass filter processing, specifically, as the threshold value, for example as shown in FIG. 17B, a region ar_LPF2 surrounded by (180, 156), (156, 180), (−156, 180), (−180, 156), (−180, −156), (−156, −180), (156, −180), (180, −156) is set in the two-dimensional Fourier space.

In the second low-pass filter processing, for example, as image data after the first low-pass filter processing, based on the image data S102 shown in FIG. 16C and FIG. 17C, the low-pass filter portion 1811 specifies low frequency component data in the region ar_LPF2 in the Fourier space shown in FIG. 17B. For example, when the specified low frequency component data is subjected to two-dimensional Fourier transform processing, an image S104 shown in FIG. 17D is obtained. For example, when a pixel value of the image data S104 is subjected to binarization processing (for example, rounding up 6 or more and rounding off 5 or less), image data S105 shown in FIG. 17E is obtained.

FIG. 18A to FIG. 18E are views for explaining an operation of a third low-pass filter processing of the low-pass filter portion.

As third low-pass filter processing, the low-pass filter portion 1811 sets a region being larger than the region ar_LPF2 shown in FIG. 18A as explained above, a region ar_LPF3, for example as shown in FIG. 18B.

In the third low-pass filter processing, specifically, as the threshold value, for example as shown in FIG. 18B, a region ar_LPF3 surrounded by (180, 157), (157, 180), (−157, 180), (−180, 157), (−180, −157), (−157, −180), (157, −180), (180, −157) is set in the two-dimensional Fourier space.

In the third low-pass filter processing, for example, as image data after the second low-pass filter processing, based on the image data S104 shown in FIG. 17D and FIG. 18A, the low-pass filter portion 1811 specifies low frequency component data in the region ar_LPF3 in the Fourier space shown in FIG. 18A.

For example, when the specified low frequency component data is subjected to inverse two-dimensional Fourier transform processing, an image S106 for example shown in FIG. 18D is obtained. For example, when a pixel value of the image data S106 is subjected to binarization processing (for example, rounding up 6 or more and rounding off 5 or less), image data S107 shown in FIG. 18E is obtained.

Figure 21:
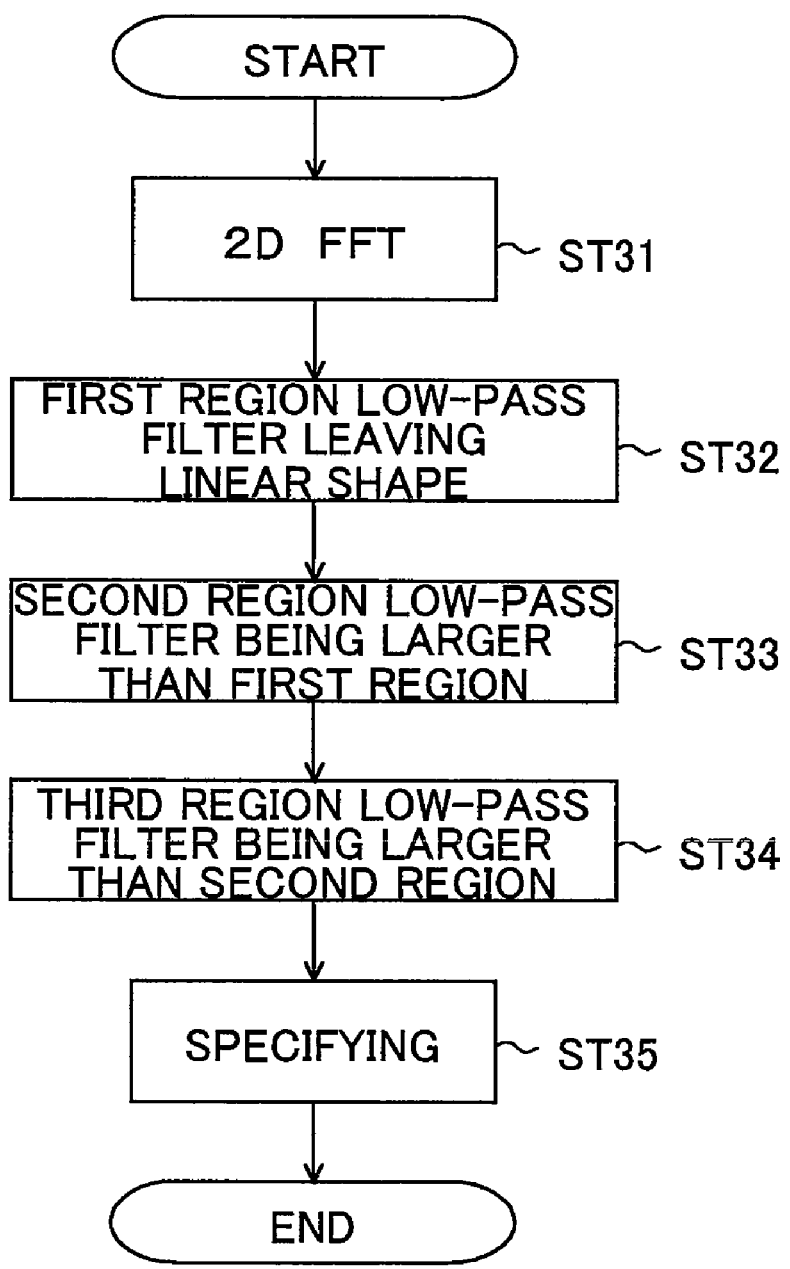
FIG. 21 is a flowchart for explaining an operation of the low-pass filter portion of the data processing apparatus shown in FIG. 1.

FIG. 19A to FIG. 19F and FIG. 20A to FIG. 20C are views for explaining an operation of the low-pass filter portion of the data processing apparatus shown in FIG. 1. FIG. 21 is a flowchart for explaining an operation of the low-pass filter portion of the data processing apparatus shown in FIG. 1. With reference to FIG. 14C, FIG. 19A to FIG. 19F, FIG. 20A to FIG. 20C and FIG. 21, an operation of the low-pass filter portion 1811 will be explained.

Figure 19C:
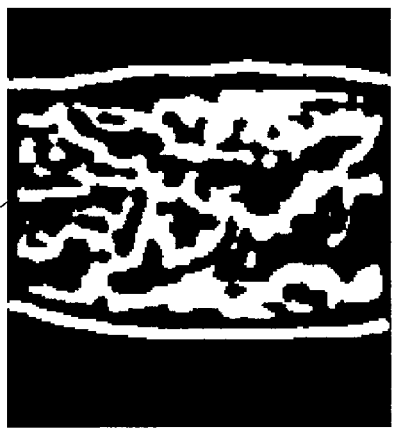
FIG. 19A to FIG. 19F are views for explaining an operation of the low-pass filter portion of the data processing apparatus shown in FIG. 1.
Figure 19B:
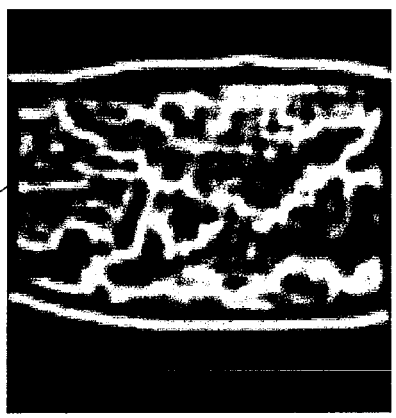
Figure 19A:
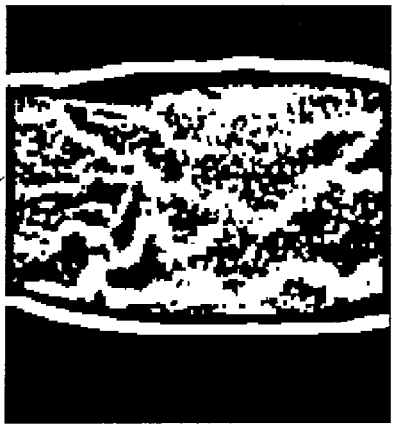

In a step ST31, the low-pass filter portion 1811 performs two-dimensional Fourier transform processing on the image data S1810, for example, shown in FIG. 14C and FIG. 19A as the first low-pass filter processing, sets a region ar_LPF1 to cut corners ar_h as high frequency components in the Fourier space, specifies low frequency component data in the region ar_LPF1, performs inverse two-dimensional Fourier transform processing, and generates image data S18011 shown in FIG. 19B (ST32). For example, when the image data S18011 is subjected to binarization processing (for example, rounding up 6 or more and rounding off 5 or less), image data S18103 shown in FIG. 19C is obtained.

Figure 19F:
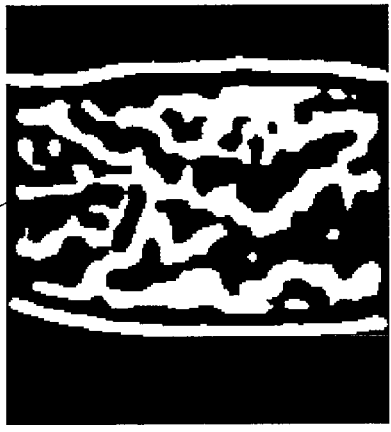
Figure 19E:
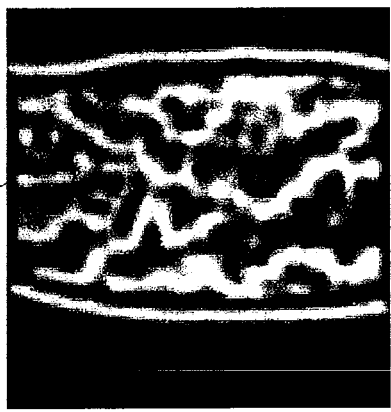
Figure 19D:
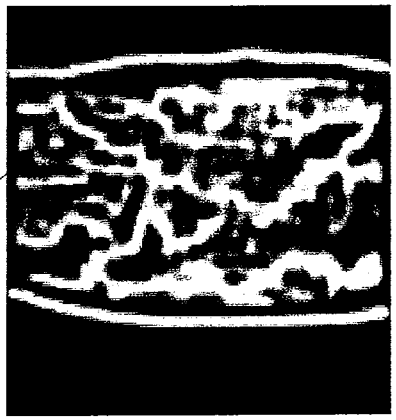

In a step ST33, as the second low-pass filter processing, the low-pass filter portion 1811 performs two-dimensional Fourier transform processing based on the image data S18102 shown in FIG. 19B and FIG. 19D, sets a region ar_LPF2, for example shown in FIG. 17B, for example, being larger than the region ar_LPF1, specifies low frequency component data in the region ar_LPF2, performs inverse two-dimensional Fourier transform processing, and generates image data S18014 shown in FIG. 19E (ST33). For example, when binarization processing (for example, rounding up 6 or more and rounding off 5 or less) is performed on the image data S18014, image data S18105 shown in FIG. 19F is obtained.

In a step ST34, as the third low-pass filter processing, based on the image data S18104 shown in FIG. 19E and FIG. 20A, the low-pass filter portion 1811 performs two-dimensional Fourier transform processing, sets, for example, a region being larger than the region ar_LPF2, for example a region ar_LPF3 shown in FIG. 18B (ST34), specifies low frequency component data in the region ar_LPF3 (ST35), performs inverse two-dimensional Fourier transform processing to generate image data S18106 shown in FIG. 20B, performs binarization processing (for example, rounding up 6 or more and rounding off 5 or less) on the image data S18106, and generates the image data S1811 shown in FIG. 19F.

As explained above, as a result that the low-pass filter portion 1811 specifies low frequency components comparing with the threshold value to leave a linear pattern by frequency components in the two-dimensional Fourier space obtained by performing two-dimensional Fourier transform processing on image data so as to leave the linear pattern in the image data, and the specified low frequency component data is subjected to inverse two-dimensional Fourier transform processing; a linear pattern can be extracted. Also, by removing high frequency component data comparing with the threshold value, it is possible to remove a geometrically symmetric pattern, for example, an approximately circular pattern.

Also, since the low-pass filter portion 1811 performs low-pass filter processing for a plurality of times by making the filter region ar_LPF larger, a linear pattern can be extracted with higher accuracy.

Figure 22C:
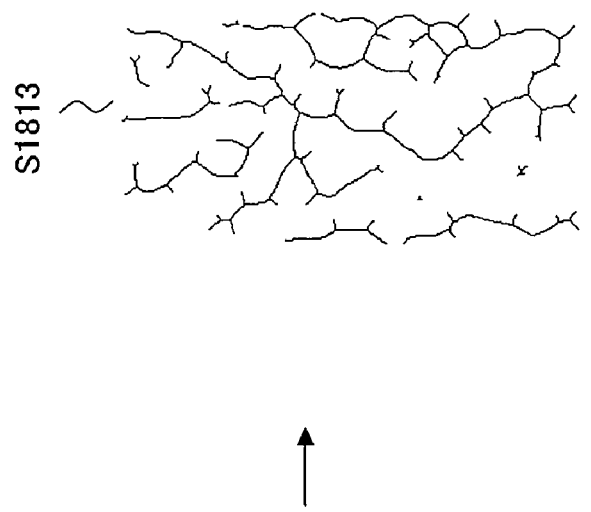
FIG. 22A to FIG. 22C are views for explaining an operation of a mask portion and a skeleton portion of the data processing apparatus shown in FIG. 1.
Figure 22B:
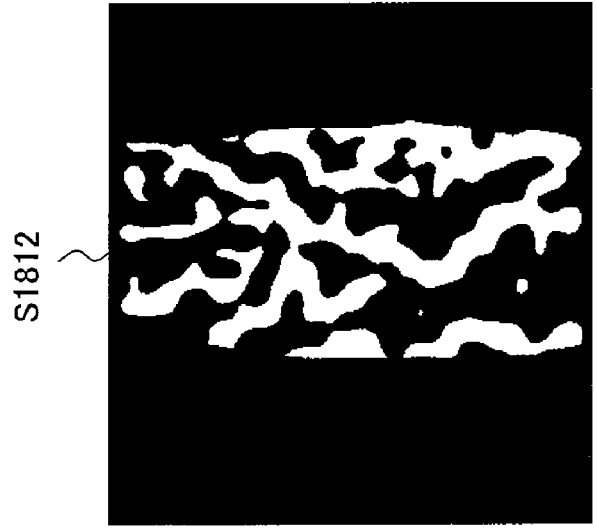
Figure 22A:
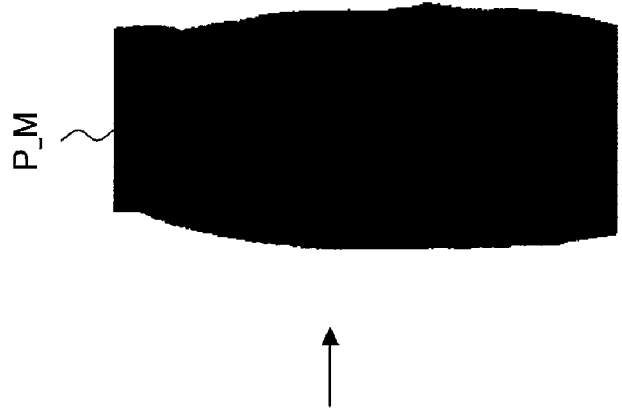

FIG. 22A to FIG. 22C are views for explaining an operation of a mask portion and a skeleton portion of the data processing apparatus shown in FIG. 1.

The data processing apparatus 1 extracts a region to be used for authentication from image data. In the present embodiment, the data processing apparatus 1 extracts a region including a pattern indicating blood vessels in image data as a region to be used for authentication.

The mask portion 1812 extracts a region P_N to be used for authentication, for example, in the image data S1811 shown in FIG. 20C, and removes a pattern P_ct not to be used for authentication.

Specifically, based on the image data S1811, the mask portion 1812 generates a mask pattern P_M as shown in FIG. 22A to extract the region P_N to be used for authentication in the image data S1811, extracts a region indicated by the mask pattern P_M from the image data S1811, and generates image data S1812, for example, shown in FIG. 22B.

The skeleton portion 1813 generates image data S1813 by performing skeleton processing based on the image data S1812. Also, the skeleton portion 1813 outputs the image data S1813 as a signal S102 to the authentication unit 103.

Specifically, the skeleton portion 1813 performs degeneration processing by using the Morphology function based on the image data S1812, for example, shown in FIG. 22B, makes a pattern indicating blood vessels thin and generates image data S1813 obtained by extracting only the center portion of the pattern. The image data S1813 shown in FIG. 22C indicates an image, wherein black and white are inversed for a plain explanation.

Based on the signal S102 from the extraction unit 102, the authentication unit 103 performs matching processing with registered image data D_P stored in the memory unit 17 in advance, and performs authentication processing.

FIG. 23 is a flowchart for explaining an overall operation of the data processing apparatus shown in FIG. 1. With reference to FIG. 23, an operation of the data processing apparatus 1 will be explained plainly. In the present embodiment, an explanation will be made on the case where a picture of a body of a subject h, for example a finger, is taken to generate image data, a pattern indicating veins of the finger in the image data is extracted, and authentication processing is performed based on the pattern.

In a step ST101, the CPU 18 makes the irradiation portion 1011 of the image pickup system 101 irradiate a near infrared ray to the finger of the subject h. In the image pickup unit 11, RGB image data S11 is generated based on a transmitted light inputted through the subject h and the optical lens 1012.

In a step ST102, the gray scale conversion portion 1801 performs, for example, conversion to gray scale of 256 tones based on the RGB signal S11, and outputs this as a signal S1801 to the distribution data generation portion 1802.

In the present embodiment, the image pickup system 101 generates the RGB image data S11, but the present invention is not limited to this embodiment. For example, in the case where the image pickup system 101 generates gray scale image data S11, processing of the gray scale conversion portion 1801 in the step ST102 is not performed and the image data S11 is output to the distribution data generation portion 1082.

In a step ST103, in the distribution data generation portion 1802, based on the signal S1801, for example, when assuming the abscissa axis c is a tone value (also referred to as a pixel value) and the ordinate axis f is the number (also referred to as a degree) of the pixel data, for example as shown in FIG. 4C, histogram is generated as distribution data d1 for pixel data indicating pixel values in a 256-tone range as a first range r1.

In a step ST104, in the specifying portion 1803, based on the signal S1802, for example as shown in FIG. 5A, for the distribution data d1, a range of not more than the maximum pixel value of r11 among pixel values r11, r12, r13 and r14 by the number of predetermined threshold value V_th in the first range r1 is specified as a second region r2, and outputs this as a signal S1803.

Based on the signal S1803, the mapping portion 1804 maps pixel data in the second region r2 specified by the specifying portion 1803 among a plurality of pixel data to the first region r1, generates second image data composed of the mapped pixel data, and outputs this as a signal S1804 to the Gaussian filter 1805.

Specifically, for example in the case where a range of pixel values of 0 to 110 is the second range r2 as shown in FIG. 4C, the mapping portion 1804 performs mapping by enlarging the pixel data to the first range r1 as a range of pixel values of 0 to 256 as shown in FIG. 4D, enlarges the center portion of the image data including blood vessel information as shown in FIG. 4E, and generates second image data S1804 (ST105).

In a step ST106, for example, the selection portion 1814 detects noise distribution characteristics of the signal S1804, and outputs to the noise removing filter 1815 a signal S1814 to select any (at least one) noise removing filter suitable to the noise characteristics from a plurality of noise removing filters based on the detection results. For example, the selection portion 1814 outputs to the noise removing filter 1815 a signal S1814 to select the Gaussian filter 1815_1 and the Gaussian Laplacian filter 1815_10 for the noise removing processing.

In the noise removing filter 1815, any noise removing filter is selected in accordance with the signal S1814 and, for example, the Gaussian filter 1815_1 and the Gaussian Laplacian filter 1815_10 are selected. For convenience of the explanation, the Gaussian filter 1815_1 and the Gaussian Laplacian filter 1815_10 are respectively explained as the Gaussian filter 1805 and the Gaussian Laplacian filter 1806.

The Gaussian filter 1805 performs noise removing processing shown in the formulas (1) and (3) based on the signal S1804, for example, shown in FIG. 10A, generates image data S1805, for example, shown in FIG. 10B and outputs to the Gaussian Laplacian filter 1806.

In a step ST107, the Gaussian Laplacian filter 1806 performs edge enhancement processing based on the signal S1805, for example, shown in FIG. 10B, generates and outputs image data S1806, for example, shown in FIG. 10C. At this time, the image data S1806 is a binarized image data.

The Gaussian Laplacian filter 1806 performs binarization processing based on a threshold value regulated in the first region r1 shown in FIG. 4C when performing binarization processing.

In a step ST108, based on the image data S1806, for example, shown in FIG. 10C, the first degeneration processing portion 1807 generates image S1807 as shown in FIG. 14A by using as the focused pixel g_att the minimum pixel data among pixel data in a cross-shaped element EL1 as the first region, wherein the focused pixel data is at the center, for example, as shown in FIG. 13A.

In a step ST109, based on the image data S1807, for example, shown in FIG. 14A, the first expansion processing portion 1808 generates image data S1808 as shown in FIG. 14B by using as the focused pixel g_att the maximum pixel data among pixel data in a cross-shaped element EL1 as the first region, wherein the focused pixel data is at the center, for example, as shown in FIG. 13A.

In a step ST110, based on the image data S1808, for example, shown in FIG. 14B, the second expansion processing portion 1809 generates image data S1809 by using as the focused pixel g_att the maximum pixel data among pixel data in a 3×3 rectangular shaped element EL2 being larger than the first region, for example, as shown in FIG. 13D, wherein the focused pixel data is at the center.

In a step ST111, for example, based on the image data S1809, for example, as shown in FIG. 13D, the second degeneration processing portion 1810 generates image data S1810, for example, as shown in FIG. 14C by using as the focused pixel g_att the minimum pixel data among pixel data in a 3×3 rectangular shaped element EL2, wherein the focused pixel data is at the center.

In a step ST112, as first low-pass filter processing, the low-pass filter portion 1811 performs two-dimensional Fourier transform processing on the image data S1810, for example, shown in FIG. 14C and FIG. 19A, sets a region ar_LPF1 to cut corners ar_h as high frequency components in the Fourier space, for example, as shown in FIG. 16C, specifies low frequency component data in the region ar_LPF1, and performs inverse two-dimensional Fourier transform processing to generate image data S18011 shown in FIG. 19B.

As second low pass filter processing, the low-pass filter portion 1811 performs two-dimensional Fourier transform processing based on the image data S18102 shown in FIG. 19B and FIG. 19D, sets, for example, a larger region than the region ar_LPF1, for example, a region ar_LPF2 shown in FIG. 17B, specifies low frequency component data in the region ar_LPF2, and performs inverse two-dimensional Fourier transform processing to generate image data S18014 shown in FIG. 19E.

As third low-pass filter processing, the low-pass filter portion 1811 performs two-dimensional Fourier transform processing based on the image data S18104 shown in FIG. 19E and FIG. 20A, sets, for example, a larger region than the region ar_LPF2, for example, a region ar_LPF3 shown in FIG. 18B, specifies low frequency component data in the region ar_LPF3, performs inverse two-dimensional Fourier transform processing to generate image data S18016 shown in FIG. 20B, performs binarization processing (for example, rounding up 6 or more and rounding off 5 or less) on the image data S18016 (ST113) and generates image data S1811 shown in FIG. 19F.

In a step ST114, to extract a region P_N to be used for authentication from the image data S1811 based on the image data S1811, the mask portion 1812 generates a mask pattern P_M as shown in FIG. 22A, extracts a region indicated by the mask pattern P_M from the image data S1811, and generates image data S1812, for example, shown in FIG. 22B.

In the step ST114, the skeleton portion 1813 performs degeneration processing by using the Morphology function based on the image data S1812, for example, shown in FIG. 22B, makes a focused pattern, for example, a pattern indicating blood vessels thin as shown in FIG. 22, generates image data S1813 obtained by extracting only the center portion of the pattern, and outputs as a signal S102 to the authentication unit 103.

In the authentication unit 103, matching processing, for example, with pre-registered image data D_P stored in the memory unit 17 is performed based on the signal S102, and authentication processing is performed.

As explained above, the data processing apparatus 1 generates distribution data by the distribution data generation portion 1802, for example, as shown in FIG. 5A and FIG. 5B, specifies a second region by the specifying portion 1803, maps the second region to the first region by the mapping portion 1804, and generates third image data by binarization based on a threshold value regulated in the first region r1 by components 1805 to 1812; therefore, binarization can be suitably performed even in the case where distribution data d1 of pixel values differs for each subject h.

Also, as a result that the selection portion 1814 for selecting any noise removing processing among a plurality of noise removing processing and a noise removing filter 1815, for example, having a plurality of different kinds of noise removing filters are provided, for example, a filter selected, for example, by the selection portion 1814 performs noise removing processing based on the signal S1804, then, the Gaussian Laplacian filter 1806 performs edge enhancement processing and binarization; it is possible to remove noises caused by diffused reflection of a body of the subject h and image pickup unit 11 and other devices, for example, from the image data S1804, and suitably binarized image data can be generated based on the predetermined threshold value of the first region r1.

Also, for each of a plurality of pixel data composing the image data S1806 and indicating pixel values, the first degeneration processing portion 1807 for generating image data S1807 by using as predetermined pixel data the minimum pixel data among pixel data in the first region around the pixel data, the first expansion processing portion 1808 for generating image data S1808 by using as predetermined pixel data the maximum pixel data among pixel data in the first region around the pixel data, the second expansion processing portion 1809 for generating image data S1809 by using as predetermined pixel data the maximum pixel data among pixel data in the second region being larger than the first region around the pixel data, and the second degeneration processing portion 1810 for generating image data S1810 by using as predetermined pixel data the minimum pixel data among pixel data in the second region being larger than the first region around the pixel data; it is possible to remove regions being smaller than a predetermined size and to connect between pixel data close to a certain extent to each other. Furthermore, it is possible to leave a linear pattern, and a pattern as noise components can be removed.

Also, as a result that the low-pass filter portion 1811 specifies low frequency component data comparing with the threshold value to leave a linear pattern by frequency components in the two-dimensional Fourier space obtained by performing two-dimensional Fourier transform processing on image data so as to leave the linear pattern in the image data, and performs inverse two-dimensional Fourier transform processing on the specified low frequency component data, it is possible to extract a linear pattern. Also, a geometrically symmetric pattern can be removed.

Also, as a result of performing a series of processing operations, for example, a pattern indicating blood vessels of a subject h can be extracted with high accuracy.

Also, it is possible to extract a pattern indicating individually unique vein of blood vessels with high accuracy, so that authentication with higher accuracy can be performed based on the pattern.

Also in a conventional data processing apparatus, troublesome processing of using an AI filter for blood vessel tracing based on blood vessel information from image data was performed. However, in the data processing apparatus 1 according to the present embodiment, it is possible to extract a pattern indicating blood vessels with high accuracy based on image data obtained by taking a picture of a subject h, so that a load on processing becomes lighter comparing with that in the conventional case.

Also, the skeleton portion 1813 extracts the center portion of a pattern indicating blood vessels when performing skeleton processing, thus, it is possible to generate skeleton image data less affected by expansion and contraction of blood vessel, for example, along with changes of physical conditions of the subject h. Since the authentication unit 103 uses the image data for authentication processing, it is possible to perform authentication processing with high accuracy even when a physical conditions of the subject h change.

Also, the present embodiment can be realized by combining filters requiring light processing, therefore, an individual authentication system with a high processing speed can be developed.

Figure 24:
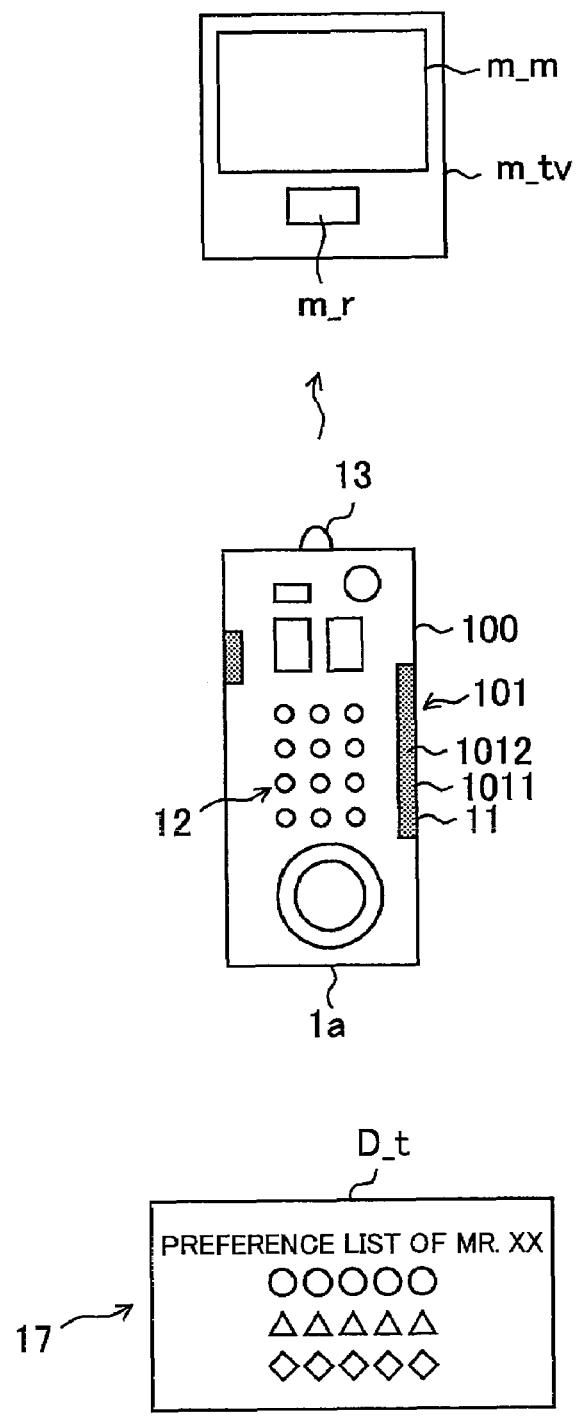
FIG. 24 is a view for explaining a second embodiment of a remote-control device using a data processing apparatus according to the present invention.

FIG. 24 is a view for explaining a second embodiment of a remote-control device using the data processing apparatus according to the present invention.

A remote-control device (also referred to as a remote controller) 1a according to the present embodiment is a general remote controller provided therein with the data processing apparatus 1 according to the first embodiment.

Specifically, as same as the data processing apparatus according to the first embodiment, for example, shown in FIG. 2, the remote-control device 1a comprises an image pickup unit 11, an input unit 12, an output unit 13, a communication interface 14, a RAM 15, a ROM 16, a memory unit 17 and a CPU 18. An explanation will be made only on different points from the data processing apparatus 1 according to the first embodiment.

In the remote-control apparatus 1a, for example, an irradiation portion 1011, an optical lens 1012 and the image pickup unit 11 as an image pickup system 101 are provided to a body portion 100.

The output portion 13 transmits a control signal to make a television set m_tv perform predetermined processing by using an infrared ray as a carrier wave, for example, by being controlled by the CPU 18. For example, the output unit 13 is composed of an infrared ray light emitting element.

The television set m_tv performs predetermined processing in accordance with a control signal received at a light receiving portion m_r, for example, displaying predetermined image on a display portion m_m.

The memory unit 17 stores, for example, data D_t indicating users' preferences, specifically, a preference list D_t as shown in FIG. 24. The data D_t is read and written in accordance with need by the CPU 18.

The CPU 18 performs processing, for example, in accordance with the data D_t when authentication is performed normally.

Figure 25:
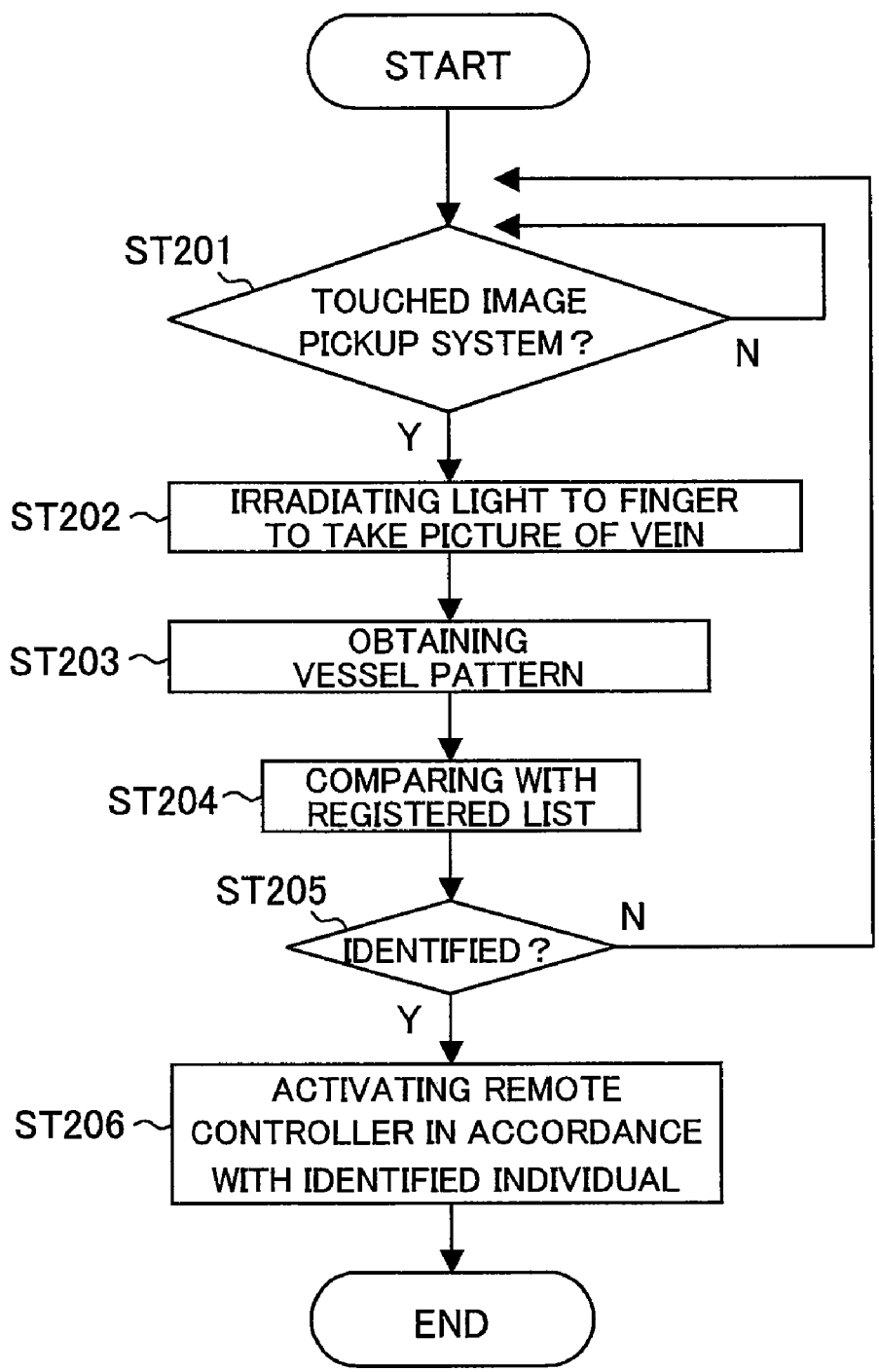
FIG. 25 is a flowchart for explaining an operation of a remote-control device 1a shown in FIG. 24.

FIG. 25 is a flowchart for explaining an operation of the remote-control device 1a shown in FIG. 24.

In a step ST201, whether a user touched the image pickup system 101 provided on the side surface of the body portion 100 is determined. For example, when a finger touched the image pickup system 101, the procedure proceeds to processing in a step ST202.

In the step ST202, by the CPU 18, a near infrared ray is irradiated from the irradiation portion 1011 to a finger of the subject h, and the image pickup unit 11 generates image data of finger blood vessels based on a transmitted light. In the present embodiment, a light irradiated from the irradiation portion 1011 is used, but the present invention is not limited to this embodiment. For example, the image pickup unit 11 may generate image data based on the transmitted light of the subject h by a natural light.

In a step ST203, the CPU 18 extracts image data to be used for authentication by the extraction unit 102, for example, skeleton image data indicating a pattern indicating blood vessels, and outputs as a signal S102 to the authentication unit 103.

In a step ST204, the CPU 18 makes the authentication unit 103 perform authentication processing by comparing the signal S102 with users' registered image data D_P stored in the memory unit 17 in advance.

In a step ST205, when the authentication unit 103 recognizes it is not the user stored in advance, the procedure returns back to the processing in the step ST201.

On the other hand, when the authentication unit 103 recognizes it is the user stored in advance in the determination in the step ST205, the CPU 18 performs processing in accordance with the data D_t indicating preference of the user stored in the memory unit 17. For example, a control signal in accordance with the data D_t is output to the television set m_tv.

As explained above, in the present embodiment, since a remote-control device comprising the data processing apparatus according to the first embodiment is provided, for example, it is possible to control the television set m_tv based on the authentication result.

Also, for example, age and other information are included in the data D_t. When the user is determined to be underage as a result of the authentication by the authentication unit 103, an age limiting function can be realized by performing limiting processing, such that the CPU 18 invalidates a specific button to keep programs on the television blocked, etc.

Also, the data D_t includes display of program listing (a preference list and history, etc.) customized for each user and use of programmed recording list, etc. The CPU 18 is capable of performing processing in accordance with the respective users by controlling that the data can be used when authentication by the authentication unit 103 is normal.

Also, a plurality of predetermined data may be registered for each user in the data D_t.

Figure 26:
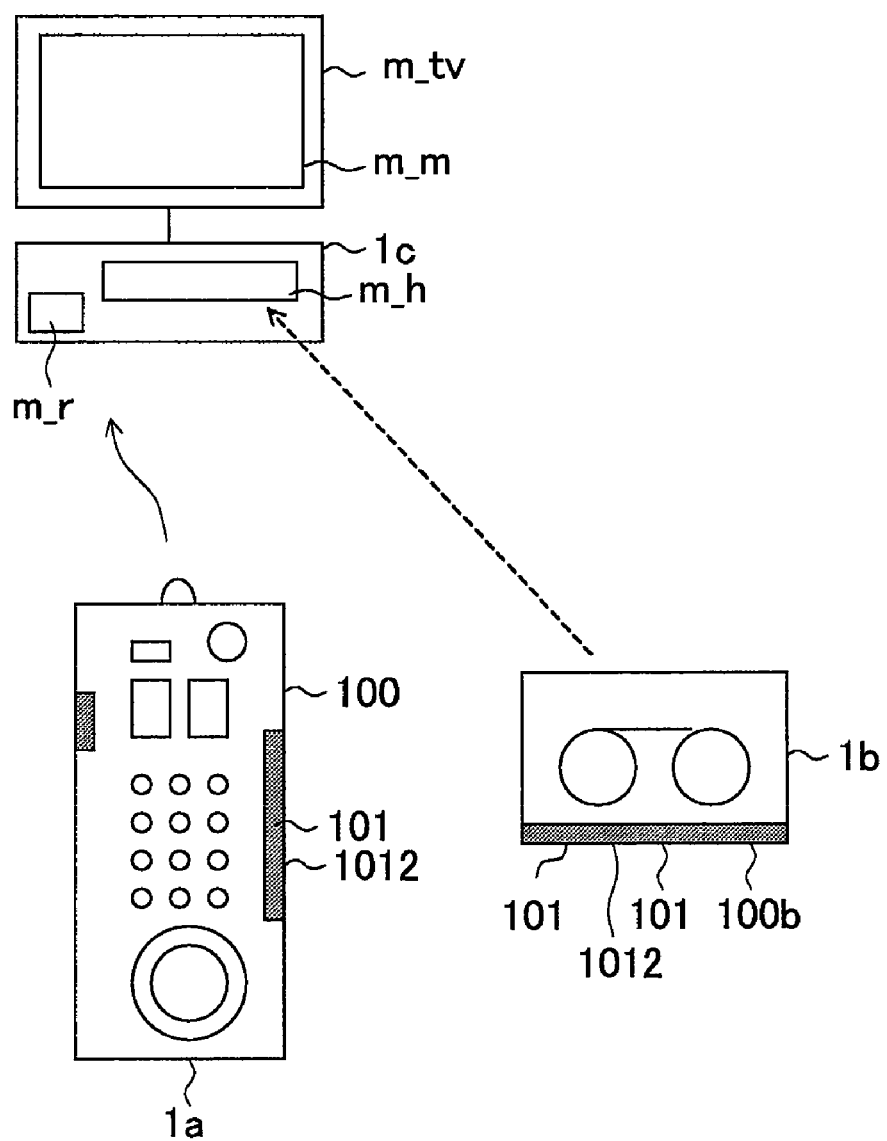
FIG. 26 is a view for explaining a third embodiment of a data processing system using the data processing apparatus according to the present invention.

FIG. 26 is a view for explaining a third embodiment of the data processing system using the data processing apparatus according to the present invention.

A data processing system 10b according to the present embodiment comprises, as shown in FIG. 26, a remote-control device 1a, a recording medium (also referred to as medium) 1b, a data processing apparatus 1c and a television set m_tv. An explanation will be made only on different points from the first embodiment and the second embodiment.

In the present embodiment, for example, both of the remote-control device 1a and the recording medium 1b perform the above identification processing, and processing in accordance with both of the identified results is performed.

For example, when a user of the remote-control device 1a and a user of the recording medium 1b are identical, reading and writing of predetermined data stored in the recording medium 1b are performed.

The remote-control device 1a has the approximately same configuration as that of the remote-control device 1a according to the second embodiment and includes the data processing apparatus 1 according to the first embodiment.

The recording medium 1b comprises, for example, the data processing apparatus 1 according to the first embodiment.

For example, the recording medium 1b is a video tape and other magnetic recording media, an optical disk, a magneto-optical disk, a semiconductor memory, and other data recording media.

As same as in the first embodiment, for example shown in FIG. 2, the recording medium 1b comprises an image pickup unit 11, an input unit 12, an output unit 13, a communication interface 14, a RAM 15, a ROM 16, a memory unit 17 and a CPU 18. An explanation will be made only on different points from the data processing apparatus 1 according to the first embodiment.

In the recording medium 1b, an irradiation portion 1011, an optical lens 1012 and the image pickup unit 11 are provided as an image pickup system 101 to a body portion 100.

The image pickup system 101 is preferably provided at a position touched by a user on the body portion 100b. When a position touched by a user is not determined, the image pickup unit 11 is provided not only at one position but at regions that could possibly be touched by a user on the body portion 100b.

The data processing apparatus 1c is capable of reading and writing data stored by the recording medium 1b, for example, when authentication is performed normally. For example, the data processing apparatus 1c includes the data processing apparatus according to the first embodiment. For example, the data processing apparatus 1c comprises, as same as in the first embodiment shown in FIG. 2, an image pickup unit 11, an input unit 12, an output unit 13, a communication interface 14, a RAM 15, a ROM 16, a memory unit 17 and a CPU 18. An explanation will be made only on different points from the data processing apparatus 1 according to the first embodiment.

Furthermore, the data processing apparatus 1c comprises, for example, a holding portion m_h for holding the recording medium 1b, a driver for performing reading and writing of data of the recording medium 1b held by the holding portion m_h, and a light receiving portion m_r, etc.

A television set m_tv comprises a display portion m_m for displaying an image based on data, for example, from the driver of the data processing apparatus 1c.

Figure 27:
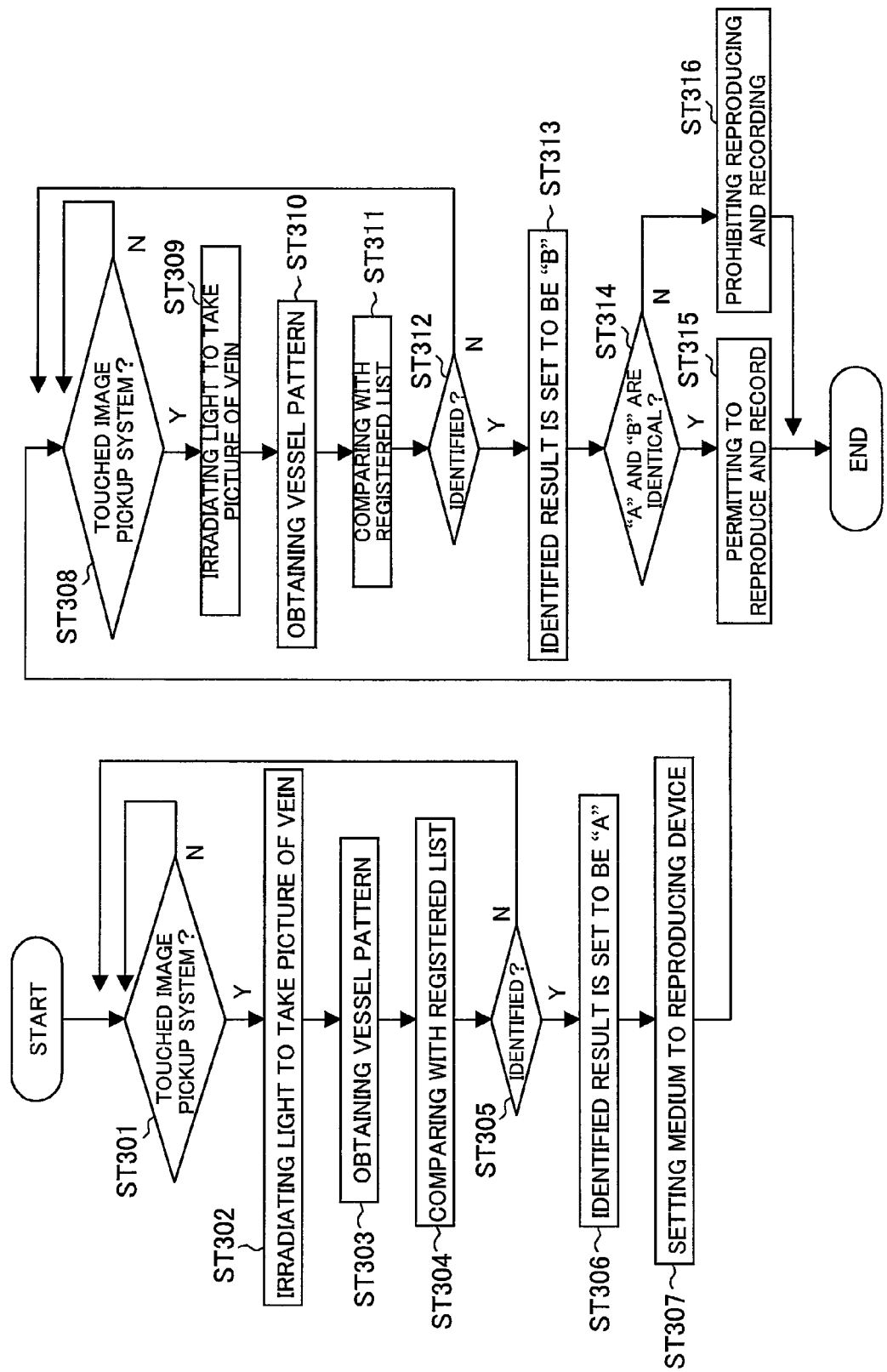
FIG. 27 is a flowchart for explaining an operation of the data processing system shown in FIG. 26.

FIG. 27 is a flowchart for explaining an operation of the data processing system shown in FIG. 26. With reference to FIG. 27, an explanation will be made only on different points from the first embodiment and the second embodiment on an operation of the data processing system 10b.

An operation of the remote-control device 1a in the steps ST301 to ST304 is the same as that in the steps ST201 to ST204 in the second embodiment, so that the explanation will be omitted.

In a step ST304, the CPU 18 of the remote-control device 1a makes the authentication unit 103 compare a signal S102 with registered image data D_P of a plurality of users stored in advance in the memory unit 17 to perform authentication processing.

In a step ST305, when it is identified to be not a user stored in advance in the authentication unit 103 of the remote-control device 1a, the procedure returns back to the processing in the step ST301.

On the other hand, in determination in the step ST305, when it is identified to be a user stored in advance in the authentication unit 103, the CPU 18 stores, for example, the identified result is stored as A in the memory unit 17 (ST306).

In the step ST307, for example, a user sets the recording medium 1b at the holding portion m_h of the data processing apparatus (also referred to as a reproduction apparatus) 1c.

In a step ST308, in the recording medium 1b, for example, whether the user touched the image pickup system 101 provided on the side surface of the body portion 100b is distinguished. When, for example, a finger touched the image pickup system 101, the procedure proceeds to processing in a step ST309.

In the step ST309, the CPU 18 of the recording medium 1b makes the irradiation portion 1011 irradiate a near infrared ray to the finger of the subject h and makes the image pickup unit 11 generate image data of the finger vein based on a transmitted light.

In a step ST310, the CPU 18 of the recording medium 1b extracts by the extraction unit 102 image data, for example, skeleton image data indicating a pattern indicating blood vessels to be used for authentication in the same way as in the first embodiment, and outputs this as a signal S102 to the authentication unit 103.

In a step ST 311, the CPU 18 of the recording medium 1b makes the authentication unit 103 compare the signal S102 with the registered image data D_P of a plurality of users stored in advance in the memory unit 17 to perform authentication processing.

In a step ST312, when it is identified to be not a user stored in advance in the authentication unit 103 of the recording medium 1b, the procedure returns back to the processing of the step ST308.

On the other hand, in determination in the step ST312, when it is identified to be a user stored in advance in the authentication unit 103 of the recording medium 1b, the CPU 18 of the recording medium 1b sets the identified result as B (ST313).

In a step ST314, the identified result A by the step ST306 and the identified result B by the step ST313 are compared and determined whether they are an identical user or not.

The determination processing may be performed in the recording medium 1b. In this case, the recording medium 1b performs processing based on the identified result A sent from the remote-control device 1a and the identified result B by the recording medium 1b.

Also, the determination processing may be performed, for example, in the data processing apparatus 1c. In this case, the data processing apparatus 1c performs processing based on the identified result A sent from the remote-control device 1a and the identified result B by the recording medium 1b.

When determined to be an identical user as a result of the determination processing in the step ST314, for example, the recording medium 1b allows the data processing apparatus 1c to read and write, for example, to reproduce and record built-in data (ST315), while when determined to be not an identical user, for example, the recording medium 1b prohibits the data processing apparatus 1c to reproduce and record the built-in data (ST316).

For example, when determined to be an identical user, for example, the data processing apparatus 1c reads data built in the recording medium 1b and makes the television set m_tv display an image in accordance with the data on the display portion m_m.

As explained above, in the present embodiment, since identification is performed by both of the remote-control device 1a and the recording medium 1b, for example, when it is an identical user from the identified result, it is possible to make the recording medium 1b store and read data. Therefore, for example, data falsifying, a stealthy glance and overwriting on data, etc. by other people can be prevented.

Figure 28:
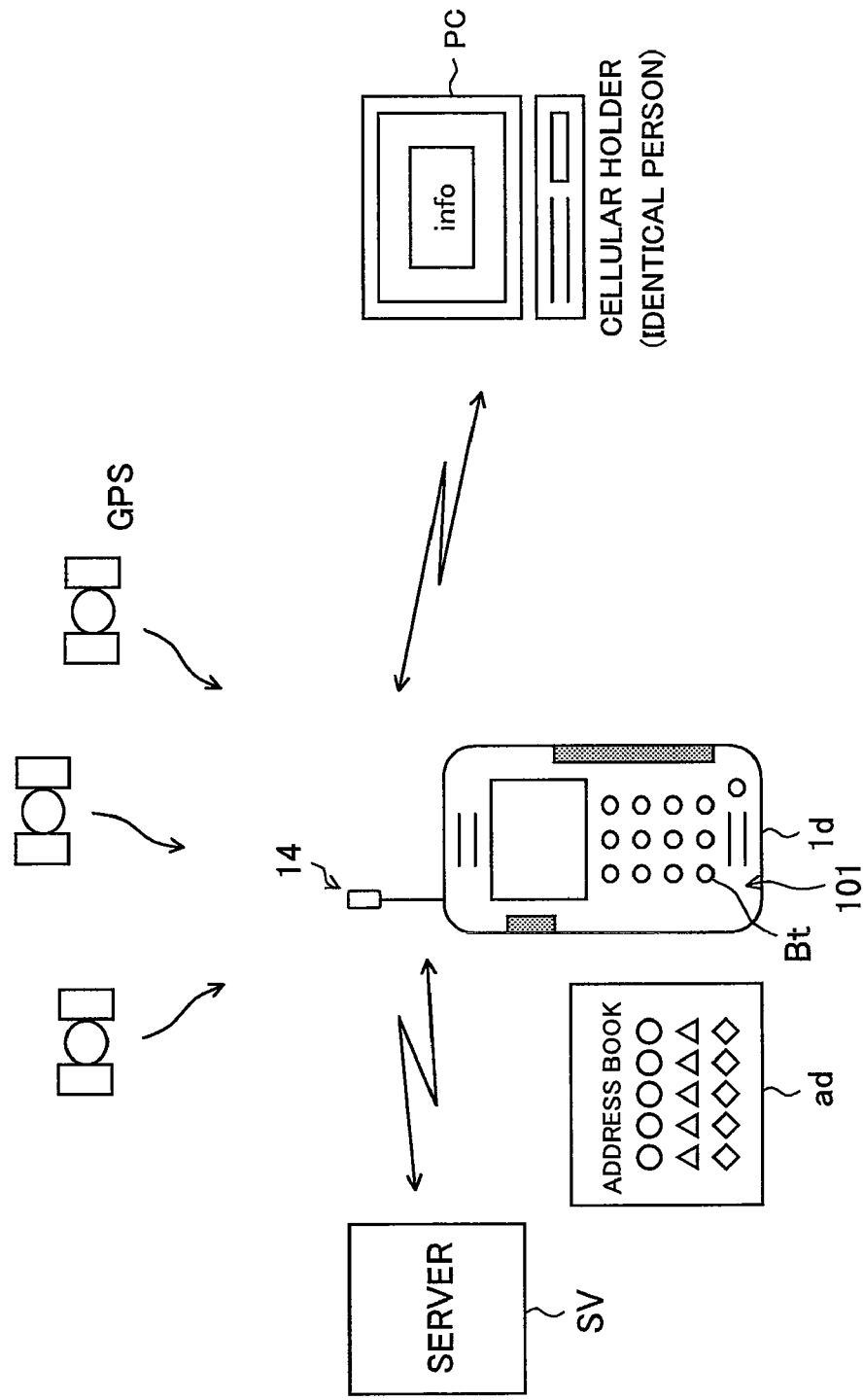
FIG. 28 is a view for explaining a fourth embodiment of a portable communication device using the data processing apparatus according to the present invention.

FIG. 28 is a view for explaining a fourth embodiment of a portable communication device using the data processing apparatus according to the present invention.

The portable communication device 1d according to the present embodiment includes the data processing apparatus according to the first embodiment.

For example, the portable communication device 1d has a general call function, an email function and an address book function, etc. and activates a predetermined function in the case of a pre-registered user as a result of the above authentication processing, but does not activate a predetermined function in the case of a not registered user.

The portable communication device 1d comprises, for example, as same as in the first embodiment shown in FIG. 2, an image pickup unit 11, an input unit 12, an output unit 13, a communication interface 14, a RAM 15, a ROM 16, a memory unit 17 and a CPU 18. An explanation will be made only on different points from the data processing apparatus 1 according to the first embodiment.

In the portable communication device 1d, an image pickup system 101 is provided, for example, to a call button bt, etc. (may be all buttons bt) as the input unit 12.

For example, the portable communication device 1d obtains an image of finger vein when a button bt is operated by the user and, when it is identified to be an already registered individual, activates a communication function as a cellular phone, and activates a desired call function via a not shown base station.

Figure 29:
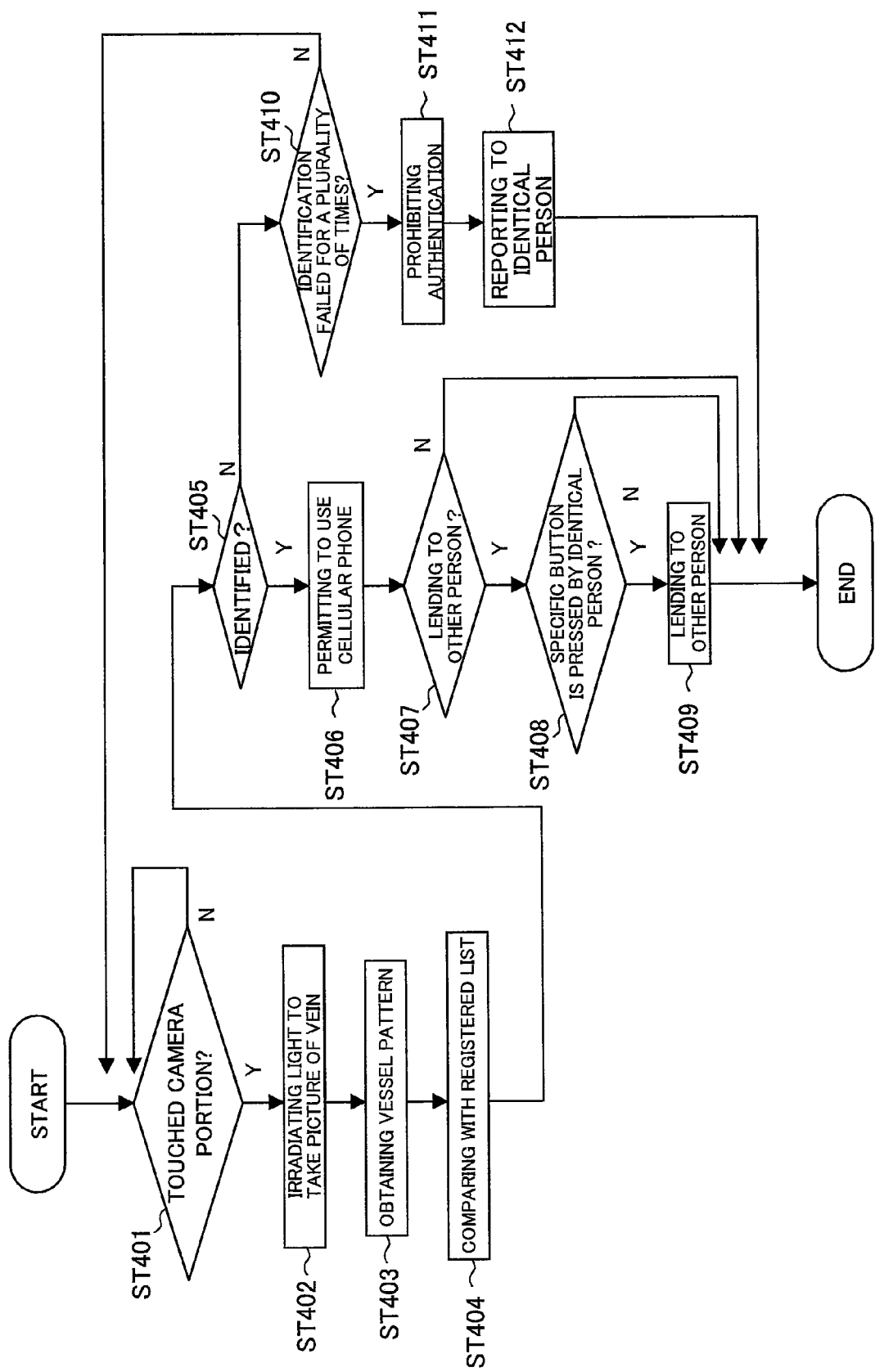
FIG. 29 is a flowchart for explaining an operation of the data processing apparatus shown in FIG. 28.

FIG. 29 is a flowchart for explaining an operation of the data processing apparatus shown in FIG. 28. With reference to FIG. 29, an operation of the portable communication device 1d will be explained on different points from the data processing apparatus according to the first to third embodiments.

In a step ST401, for example, whether a user touched the image pickup system 101 provided to a call button bt, etc. as the input unit 12 or not is distinguished. When, for example, a finger touched the image pickup system 101, the procedure proceeds to a step ST402.

In a step ST402, the CPU 18 makes the irradiation portion 1011 irradiate a near infrared ray to the finger of the subject h and makes the image pickup unit 11 generate image data of the finger vein based on a transmitted light.

In a step ST403, the CPU 18 extracts by the extraction unit 102 image data, for example, skeleton image data indicating a pattern indicating blood vessels to be used for authentication in the same way as in the first embodiment, and outputs this as a signal S102 to the authentication unit 103.

In a step ST 404, the CPU 18 makes the authentication unit 103 compare the signal S102 with the registered image data D_P of users stored in advance in the memory unit 17 to perform authentication processing.

In a step ST405, when it is identified to be a pre-registered user in the authentication unit 103, a communication function as a cellular phone is activated and the user is permitted to use the cellular phone (ST406).

For example, when a user as a holder of the portable communication device 1d lends the portable communication device 1d to other person (ST407), the portable communication device 1d determines whether the user as a holder operated a specific button (ST408).

In determination in the step ST408, when it is determined that the specific button bt is operated, the CPU 18 makes the predetermined function able to be operated by other person. The user as a holder lends the portable communication device 1d in that state to other person (ST409).

On the other hand, in the step ST408, in the case, where the CPU 18 determines that the specific button bt is not operated by the identical person, and in the case of not lending to other person, a series of processing finishes.

On the other hand, in the determination in the step ST405, when it is identified to be not a pre-registered user in the authentication unit 103 and when the identification processing is not failed for a plurality of times (ST410), the procedure returns back to the step ST401.

On the other hand, when the identification processing failed for a plurality of times, the CPU 18 prohibits the authentication processing (ST411), and the CPU 18 sends data indicating that the authentication processing failed for a plurality of times, for example, to a data communication device PC registered in advance (ST412).

As explained above, in the present embodiment, the portable communication device 1d activates a predetermined function when it is approved to be a pre-registered user as a holder from the result of the above authentication processing, it is possible to prevent the device from being used by other people, for example, in case of loss.

Also, for example, in the case of not a pre-registered user, received emails, not to mention the address book, and transmission history, etc. cannot be viewed, so that the security is tight.

Also, by registering data indicating an address, such as a mail address, in advance in the memory unit 17 and providing, for example, a GPS (global positioning system) function, information of a present position of the portable communication device 1d can be sent to a data communication device PC at an already registered address, for example, when keys are pressed for a plurality of times by someone other than the pre-registered user (when authentication failed for a plurality of times).

Also, by storing address book data ad of the user in a server device sv accessible via a not shown communication network separately from the portable communication device 1d and, for example, when the user is appropriately authenticated in the portable communication device 1d, accessing by the CPU 18 of the portable communication apparatus 1d to the server device sv via the not shown communication network to download the user's address book data, it is possible to prevent other users from improperly browsing the address book.

In this case, for example, even when other portable communication device 1d is used, it is possible to use the same address book data ad when authentication is appropriately attained by the portable communication device 1d.

Also, when the user as a holder of the portable communication device 1d needs to lend the portable communication device 1d to other person with own acknowledgement, it is possible to allow other person to use it by an operation of an exclusive button bt by the holder himself/herself. Namely, when a specific button bt is operated, the CPU 18 activates a predetermined function without performing authentication processing even in the case of being used by other person.

Figure 30:
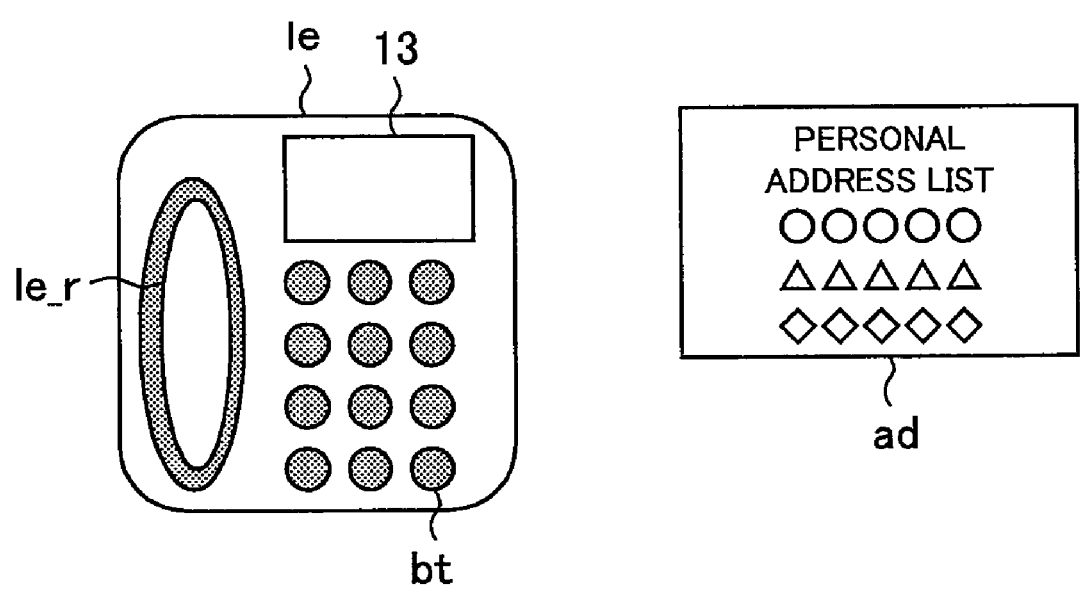
FIG. 30 is a view for explaining a fifth embodiment of the data processing apparatus according to the present invention.

FIG. 30 is a view for explaining a fifth embodiment of the data processing apparatus according to the present invention.

A telephone 1e using the data processing apparatus according to the present embodiment comprises the data processing apparatus 1 according to the first embodiment and has an individual authentication function by finger vein.

For example, in the telephone 1e according to the present embodiment, an image pickup system 101 is provided to a specific button bt, etc. (may be all buttons or its body) provided to the respective household in the same way as in the portable communication device 1d according to the fourth embodiment. The configuration of the telephone 1e is approximately the same as that of the portable communication device 1d according to the fourth embodiment. Only different points will be explained.

The telephone 1e obtains an image of finger vein, for example, when a button bt is pressed. Also, the telephone 1e has a use limiting function and an individual identification function.

Also, the telephone 1e has a limiting function for setting the maximum usable time for each user in advance and inactivating calls when reaching to a predetermined time.

Also, for example in the case of a length phone call, when it is set to perform authentication only when a button is pressed for the first time, it is not always the case that the same person would use afterwards, so that it is preferable to provide the image pickup system 101, for example, to a receiver le_r and take a picture of finger vein of a subject h regularly to continuously perform authentication processing.

Also, the telephone 1e regularly performs authentication processing and updates registered image data in the memory unit 17.

Also, for example, in the telephone 1e, different beep sound can be registered for each user, and, for example, a beep sound corresponding to the user can be output from a not shown speaker.

Figure 31:
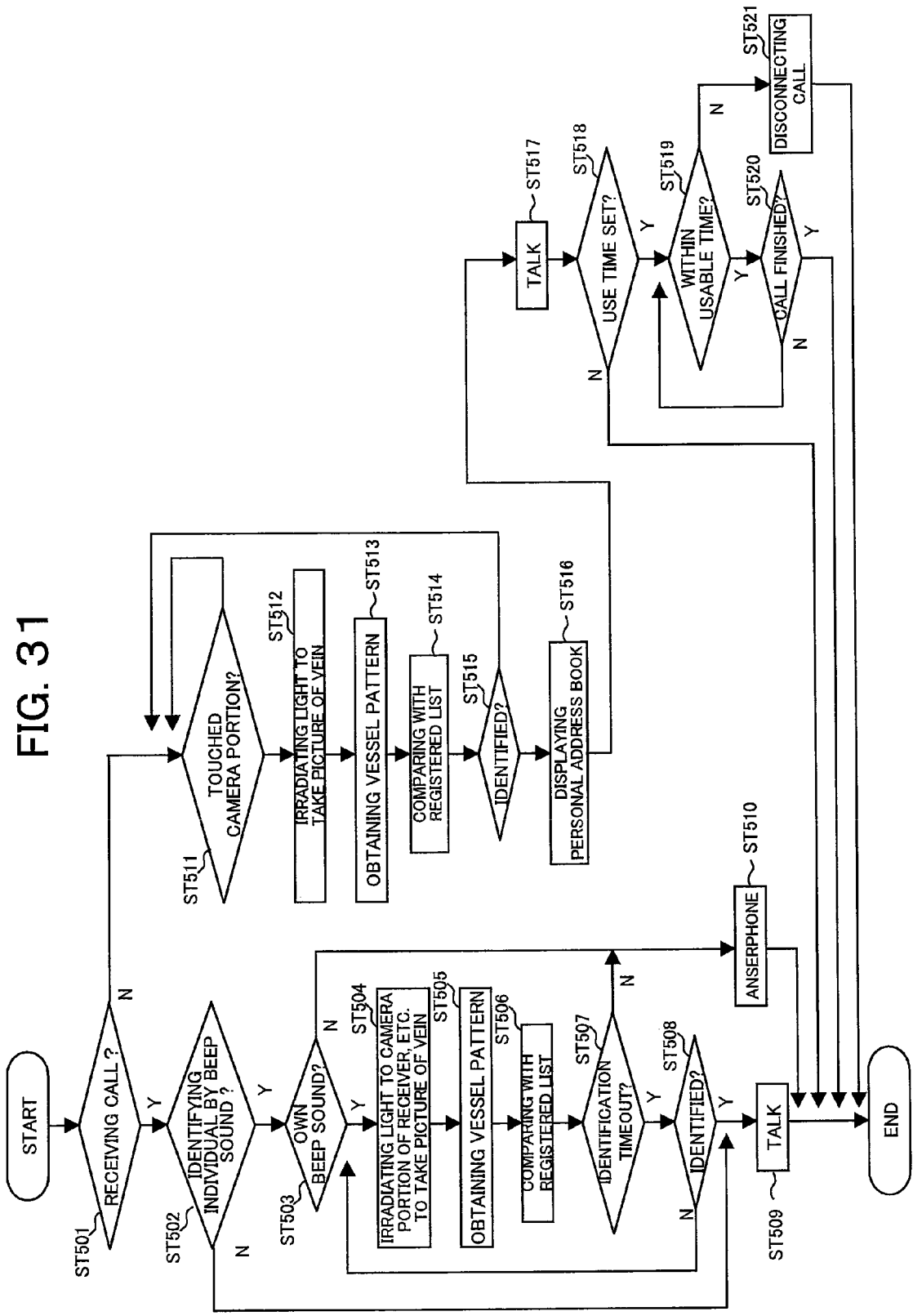
FIG. 31 is a flowchart for explaining an operation of a telephone shown in FIG. 30.

FIG. 31 is a flowchart for explaining an operation of the telephone shown in FIG. 30. With reference to FIG. 31, an operation of the telephone 1e will be explained. For example, the case where the telephone 1e is used by a plurality of users will be explained.

In a step ST501, when the CPU 18 receives a signal indicating calling from other telephone, it specifies the user based on the other party's telephone number, etc. and let beep sound corresponding to the user output from the speaker.

Whether individual identification by beep sound is used or not is determined (ST502) and, when individual identification is used, the CPU 18 makes the image pickup system 101 irradiate a light to a user's finger and take a picture of the finger (ST504) when the finger of the user corresponding to the beep sound touches the image pickup system 101 of a receiver, etc. (ST503).

In a step ST505, the same processing as in the data processing apparatus 1 according to the first embodiment is performed and image data including a pattern indicating blood vessels is generated.

In a step ST506, the CPU 18 compares the generated image data with a list of registered image data stored in the memory unit 17.

In a step ST507, identification timeout or not, that is, whether a processing time taken for identification processing is longer than a predetermined time or not, is determined; and whether identification is attained or not is determined if it is within the processing time (ST508).

When identification is appropriately attained by the determination in the step ST507, the CPU 18 sets to enable to call (ST509).

On the other hand, when identification cannot be attained appropriately by the determination in the step ST507, the procedure returns back to the step ST504 to repeat measurement. But when it becomes timeout in the step ST507, it is switched, for example, to a so-called answerphone function (ST510).

On the other hand, in the step ST502, it is also switched to an answerphone function in the same way when the beep sound is not his/her own.

On the other hand, in the step ST501, in the case of not receiving a call but making a call, the CPU 18 determines whether, for example, a user's finger touched the image pickup system 101 (ST551). When, for example, a finger touched the image pickup system 101, the procedure proceeds to a step ST512.

In the step ST512, the CPU 18 makes the irradiation portion 1011 irradiate a near infrared ray to the finger of the subject h, and makes the image pickup unit 11 generate image data of finger vein based on a transmitted light.

In a step ST513, the CPU 18 extracts by the extraction unit 102 image data to be used for authentication, for example, skeleton image data indicating a pattern indicating blood vessels in the same way as in the first embodiment, and outputs as a signal S102 to the authentication unit 103.

In a step ST514, the CPU 18 makes the authentication unit 103 compare the signal S102 with the registered image data D_P of users stored in advance in the memory unit 17 to perform authentication processing.

In a step ST515, when it is identified to be not an already stored user in the authentication unit 103, the procedure returns back to the processing in the step ST511.

On the other hand, when it is identified to be an already stored user in the authentication unit 103 in the determination in the step ST515, the CPU 18 displays on the display portion of the output unit 13 address book data ad of the identified user (ST516) and sets to enable to call (ST517).

For example, during a call, in the step S518, whether a use time is set or not is determined.

When it is set, the CPU 18 determines whether it is within a usable time or not (ST519) and determines whether the call is ended when it is within the usable time (ST520).

On the other hand, in the step ST519, when it is not within the usable time, an alert or indication of an alert is displayed on the display portion for the user, and the call is forcibly disconnected (ST521).

On the other hand, in the step ST518, when the use time is not set and when the call ended in the step ST520, a series of processing finishes.

As explained above, in the present embodiment, the telephone 1e has the data processing apparatus according to the first embodiment therein, and a use time can be set, so that, for example, a lengthy phone call can be prevented.

Also, it is possible to apply a system wherein billing of phone charges is divided for the respective users and the payment of the phone charges is made by each user.

Also, the image pickup system 101 was provided to a button bt, but the present invention is not limited to this embodiment. For example, it may be provided to a receiver le_r, etc. or provided to both of the button bt and the receiver le_r, and the both may be used appropriately depending on the situation.

Also, being different from the portable communication device, the telephone 1e can be used by a plurality of users, for example, all family members can use the same telephone, and it displays an address book for an identified user, preferable operationality is attained.

Also, when receiving a call, since beep sound can be set for each user and it can be set that only an identified individual can answer the phone, the security is tight.

Also, by performing individual identification at the time of picking up the receiver, and setting to enable to talk in the case of a preset user, tight security is attained.

Also, when the preset user is absence, it can be switched to an answerphone, for example, even if other family is at home, so that tight security is attained.

Figure 32:
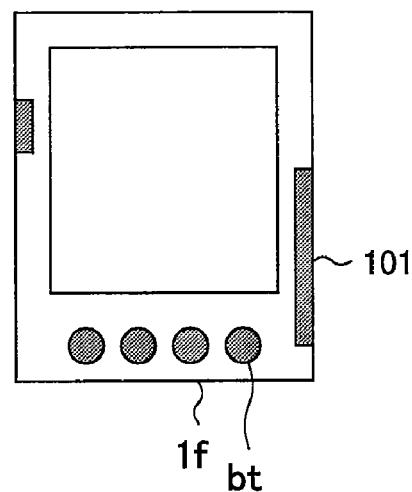
FIG. 32 is a view for explaining a sixth embodiment of the data processing apparatus according to the present invention.

FIG. 32 is a view for explaining a sixth embodiment of the data processing apparatus according to the present invention.

A PDA (personal digital assistant) if according to the present embodiment comprises the data processing apparatus 1 according to the first embodiment.

For example, as shown in FIG. 32, in the PDA if, an image pickup system 101 is provided to a side surface of the body portion or a button bt.

For example, when a user touches the PDA if, an image of finger vein is obtained, and it can be used in the case of an identical person as a result of authentication.

Alternately, it is set that private data can be displayed only in the case of an identical person as a result of authentication.

Figure 33:
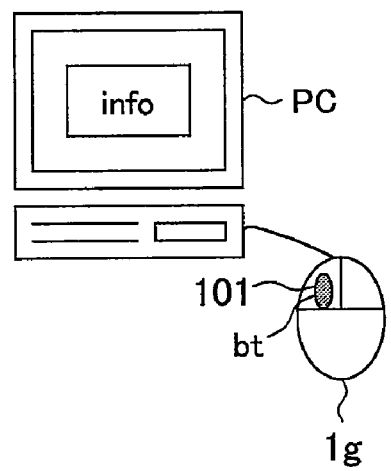
FIG. 33 is a view for explaining a seventh embodiment of the data processing apparatus according to the present invention.

FIG. 33 is a view for explaining a seventh embodiment of the data processing apparatus according to the present invention.

A mouse 1g according to the present embodiment is a so-called mouse as an input device of, for example, a personal computer PC, etc. and comprises the data processing apparatus 1 according to the first embodiment.

In the mouse 1g, an image pickup system 101 is provided, for example, to a button bt, etc.

For example, when a user touches a button bt of the mouse 1g, an image of finger vein is obtained, and it is set that login to the personal computer is possible only in the case of an identical person as a result of authentication. For example, it may be used for turning on the power of the personal computer PC and displaying a login screen, etc.

Note that the present invention is not limited to the present embodiment and a variety of any suitable modifications can be made.

An explanation was made on an example wherein the data processing apparatus 1 was built in a remote-control device and a portable communication device, but the present invention is not limited to these embodiments.

For example, a keyboard may be provided with the image pickup system 101 to take a picture of a subject h during key input, and authentication processing may be performed based on the taken image data.

Also, when using net-shopping, etc., a picture of a subject h is taken during inputting necessary information, and authentication processing may be performed based on the taken image data. In this case, it is made to be a mechanism wherein only an identical person can make an order. Also, by using it together with the credit card number and password, etc., double management can be attained and the security is furthermore improved.

Also, the image pickup system 101 may be provided to a touch panel of, for example, a bank ATM (automatic teller machine), etc. A picture of a subject h is taken when inputting necessary information, and authentication processing may be performed based on the taken image data. For example, by setting that cash can be withdrawn when a person is identified to be an identical person, the security is improved.

Also, when using together with a cash card and password, etc., the security is furthermore improved.

Also, the image pickup system 101 may be provided, for example, to a house key and a mail post, etc. to take a picture of a subject h, and authentication processing may be performed based on the taken image data. By providing a mechanism of opening a door when appropriately identified, the security is improved. Also, when it is used together with a key, etc., the security is furthermore improved.

Also, the data processing apparatus 1 may be provided, for example, to a bicycle to take a picture of a subject h, and authentication processing may be performed based on the taken image data. By providing a mechanism of turning on and off of the key when appropriately identified, the security is improved. Also, when it is used together with the key, the security is furthermore improved.

Also, for example, it may be used in place of signature when using a credit card. For example, by providing the data processing apparatus 1 to a reader/writer of a credit card, etc., it becomes possible to display the card number, for example, when identification is appropriately attained, to confirm matching with own card.

Also, by using together with a card, etc., the security is furthermore improved. Also, by using them together, it is possible to prevent misusage of the card or key in case of loss.

INDUSTRIAL APPLICABILITY

The present invention can be applied to, for example, an image processing apparatus for performing processing on image data obtained by taking a picture of a subject.

What is claimed is:

1. An image processing apparatus, comprising:
a first degeneration processing portion that generates second image data from first image data by computing, for a plurality of pixels in the first image data, a value of each pixel from a respective plurality of pixel data in a respective region of a first predetermined size around said pixel, the pixel value being a minimum of the respective plurality of pixel data, the first image data being obtained by a taking a picture of a subject;
a first expansion processing portion that generates third image data from the second image data by computing, for a plurality of pixels in the second image data, a value of each pixel from a respective plurality of pixel data in a respective region of the first predetermined size around said pixel, the pixel value being a maximum of the respective plurality of pixel data;
a second expansion processing portion that generates fourth image data from the third image data by computing, for a plurality of pixels in the third image data, a value of each pixel from a respective plurality of pixel data in a respective region of a second predetermined size around said pixel, the pixel value being a maximum of the respective plurality of pixel data; and the second predetermined size being larger than the first predetermined size;
a second degeneration processing portion that generates fifth image data from the fourth image data by computing, for a plurality of pixels in the fourth image data, a value of each pixel from a respective plurality of pixel data in a respective region of the second predetermined size around said pixel, the pixel value being a minimum of the respective plurality of pixel data; and
and a filter processing portion that generates a linear pattern based on the fifth image data.

2. An image processing method, including:
a first step for generating, with an image processing apparatus, second image data from first image data by computing, for a plurality of pixels in the first image data, a value of each pixel from a respective plurality of pixel data in a respective region of a first predetermined size around said pixel, the pixel value being a minimum of the respective plurality of pixel data, the first image data being obtained by a taking a picture of a subject;

a second step for generating, with an image processing apparatus, third image data from the second image data by computing, for a plurality of pixels in the second image data, a value of each pixel from a respective plurality of pixel data in a respective region of the first predetermined size around said pixel, the pixel value being a maximum of the respective plurality of pixel data;

a third step of generating, with an image processing apparatus, fourth image data from the third image data by computing, for a plurality of pixels in the third image data, a value of each pixel from a respective plurality of pixel data in a respective region of a second predetermined size around said pixel, the pixel value being a maximum of the respective plurality of pixel data and the second predetermined size being larger than the first predetermined size;

a fourth step for generating, with an image processing apparatus, fifth image data from the fourth image data by computing, for a plurality of pixels in the fourth image data, a value of each pixel from a respective plurality of pixel data in a respective region of the second predetermined size around said pixel, the pixel value being a minimum of the respective plurality of pixel data; and a fifth step of performing filter processing for leaving a linear pattern based on the fifth image data.

3. An image processing method as forth in claim 2, wherein said fifth step comprises specifying low frequency components comparing with a first threshold value to leave the linear pattern by frequency components in the two-dimensional Fourier space obtained by performing two-dimensional Fourier transform processing on the image data generated by the fourth step.

4. An image processing method as forth in claim 3, wherein said fifth step comprises specifying low frequency components comparing with a second threshold value larger than the first threshold value by frequency components in the two-dimensional Fourier space obtained by performing two-dimensional Fourier transform processing on the image data generated by the fourth step.

* * * * *